United States Patent
Lee et al.

(10) Patent No.: US 11,075,465 B2
(45) Date of Patent: Jul. 27, 2021

(54) SURFACE-LINK ANTENNA ARCHITECTURE

(71) Applicant: Amazon Technologies, Inc., Seattle, WA (US)

(72) Inventors: Tzung-I Lee, San Jose, CA (US); Omar Fawazhashim Zakaria, Santa Clara, CA (US); Kwok Shing Lee, Sunnyvale, CA (US); Kalyan Teja Posani, San Jose, CA (US); Ali Mirkamali, San Jose, CA (US); Cheol Su Kim, San Jose, CA (US); In Chul Hyun, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 83 days.

(21) Appl. No.: 16/034,938

(22) Filed: Jul. 13, 2018

(65) Prior Publication Data
US 2020/0021038 A1    Jan. 16, 2020

(51) Int. Cl.
*H01Q 9/04* (2006.01)
*H01Q 19/00* (2006.01)

(52) U.S. Cl.
CPC ......... *H01Q 19/005* (2013.01); *H01Q 9/0414* (2013.01); *H01Q 9/0428* (2013.01)

(58) Field of Classification Search
CPC .......... H01Q 1/28; H01Q 1/34; H01Q 9/0414; H01Q 9/0428; H01Q 19/005
See application file for complete search history.

(56) References Cited

U.S. PATENT DOCUMENTS

| | | | |
|---|---|---|---|
| 10,193,236 B1* | 1/2019 | Lee | H01Q 15/14 |
| 2009/0316612 A1* | 12/2009 | Poilasne | H01Q 1/38 |
| | | | 370/297 |
| 2013/0002254 A1* | 1/2013 | Ferrand | G01R 33/5612 |
| | | | 324/322 |

(Continued)

FOREIGN PATENT DOCUMENTS

| | | |
|---|---|---|
| CN | 1599280 A | 3/2005 |
| CN | 101621495 A | 1/2010 |

OTHER PUBLICATIONS

Netgear, N600 WIFI Dual Band Router, Data Sheet, WNDR3400, pp. 1-5, Mar. 2016.*

(Continued)

*Primary Examiner* — Graham P Smtih
(74) *Attorney, Agent, or Firm* — Lewenstein Sandler LLP

(57) ABSTRACT

Technologies for wireless network devices with surface-link antenna systems mounted on exterior surfaces of buildings are described. One wireless network device includes a housing with a circuit board and a first antenna port. A processor, a first antenna, a first wireless local area network (WLAN) radio, and a second WLAN radio are disposed on the circuit board. The first WLAN radio communicates with a radio of a client device using the first antenna over a first line-of-sight (LOS) or non-LOS wireless link (e.g., 2.4 GHz) inside the building. The second WLAN radio communicates with a radio of a second wireless network device using the second antenna over a second LOS wireless link (e.g., 5 GHz) that is external to the building. The first antenna is located inside the building and the second antenna is located along an exterior surface of the building.

20 Claims, 20 Drawing Sheets

(56) References Cited

U.S. PATENT DOCUMENTS

| | | | |
|---|---|---|---|
| 2013/0265201 A1* | 10/2013 | Kanj | H01Q 1/243 |
| | | | 343/700 MS |
| 2014/0170966 A1* | 6/2014 | Nilsson | H04B 7/0486 |
| | | | 455/14 |
| 2014/0342770 A1* | 11/2014 | Yang | H04B 7/0808 |
| | | | 455/552.1 |
| 2019/0020714 A1* | 1/2019 | Lee | H01Q 1/243 |
| 2019/0140340 A1* | 5/2019 | Ramasamy | H01Q 3/26 |
| 2019/0215765 A1* | 7/2019 | Ramasamy | H04B 1/3838 |

OTHER PUBLICATIONS

Translation of CN101621495A, Method and Device for Providing wireless broadband access service for indoor users, pp. 1-7, Jan. 6, 2010.*

International Search Report and Written Opinion dated Oct. 21, 2019, on application No. PCT/US2019/041208.

Anonymous: "wifi signal through 3 floors" Tom's Hardware forum, Jan. 9, 2017. Retrieved from the Internet: URL: https://forums.tomshardware.com/threads/wifie-signal-thorough-3-floors.2915133/ [retrieved on Oct. 11, 2019] user entry #1; p. 1 user entry #5 p. 2.

Netgear N600 Wireless Dual Band Router WNDR3400V2 User Manual, Jan. 2013.

* cited by examiner

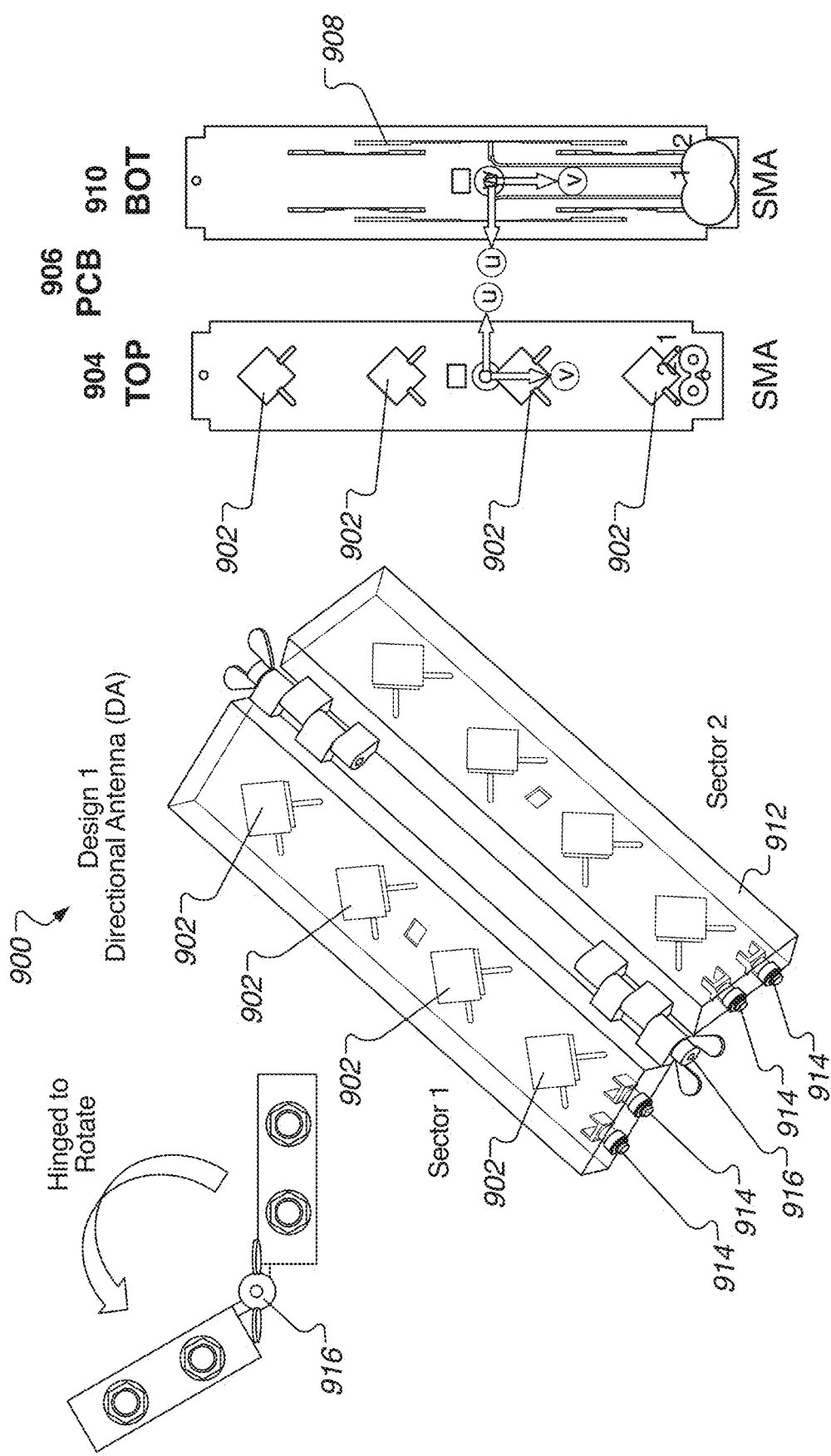

160mm x 32mm x 0.8mm

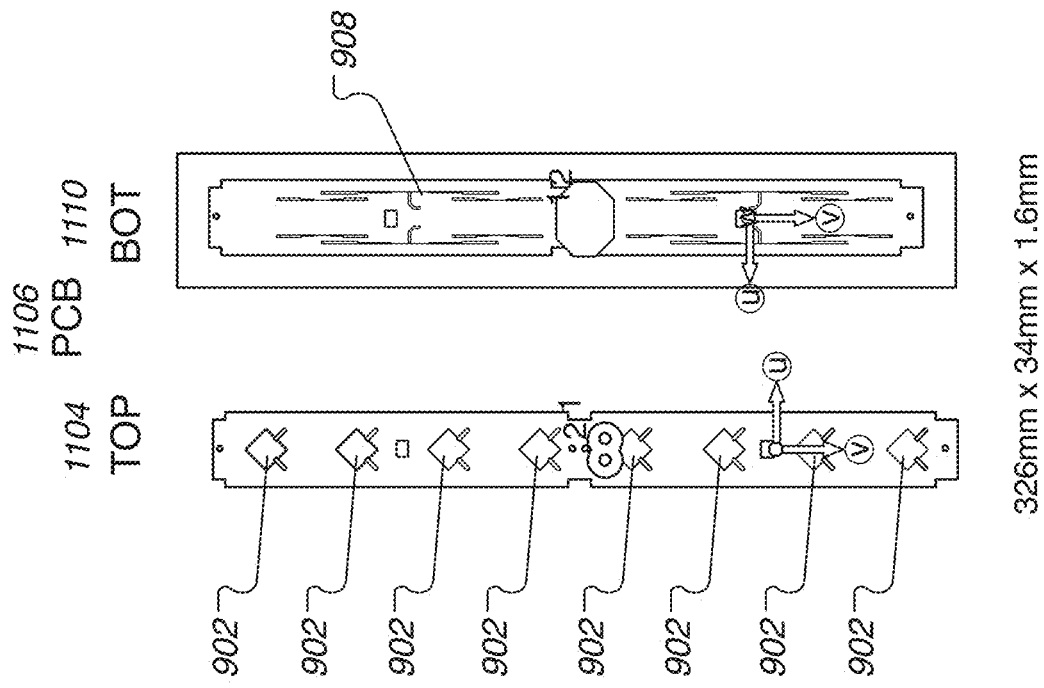
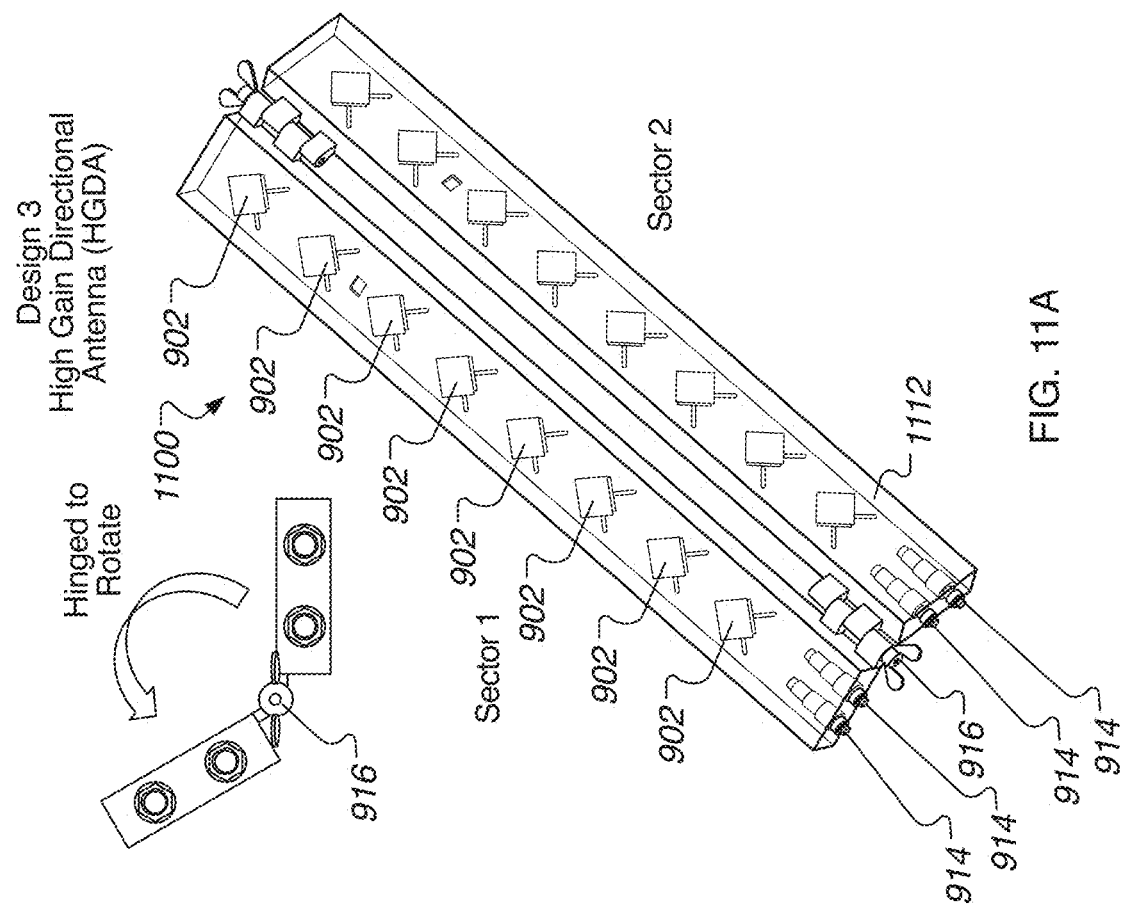
FIG. 11B
FIG. 11A

SURFACE-LINK ANTENNA ARCHITECTURE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 9A is perspective view of a directional antenna with a 4-element patch antenna array on a top layer of a printed circuit board (PCB) and a feed network on a bottom layer of the PCB according to one embodiment.

FIG. 9B illustrates a top view and a bottom view of the directional antenna of FIG. 9A according to one embodiment.

FIG. 11A is perspective view of a high gain directional antenna with a 8-element patch antenna array on a top layer of a PCB and a feed network on a bottom layer of the PCB according to one embodiment.

FIG. 11B illustrates a top view and a bottom view of the high gain directional antenna of FIG. 11A according to one embodiment.

FIG. 11C is a graph of a return loss of the high gain directional antenna of FIG. 11A according to one embodiment.

DETAILED DESCRIPTION

Figure 1:
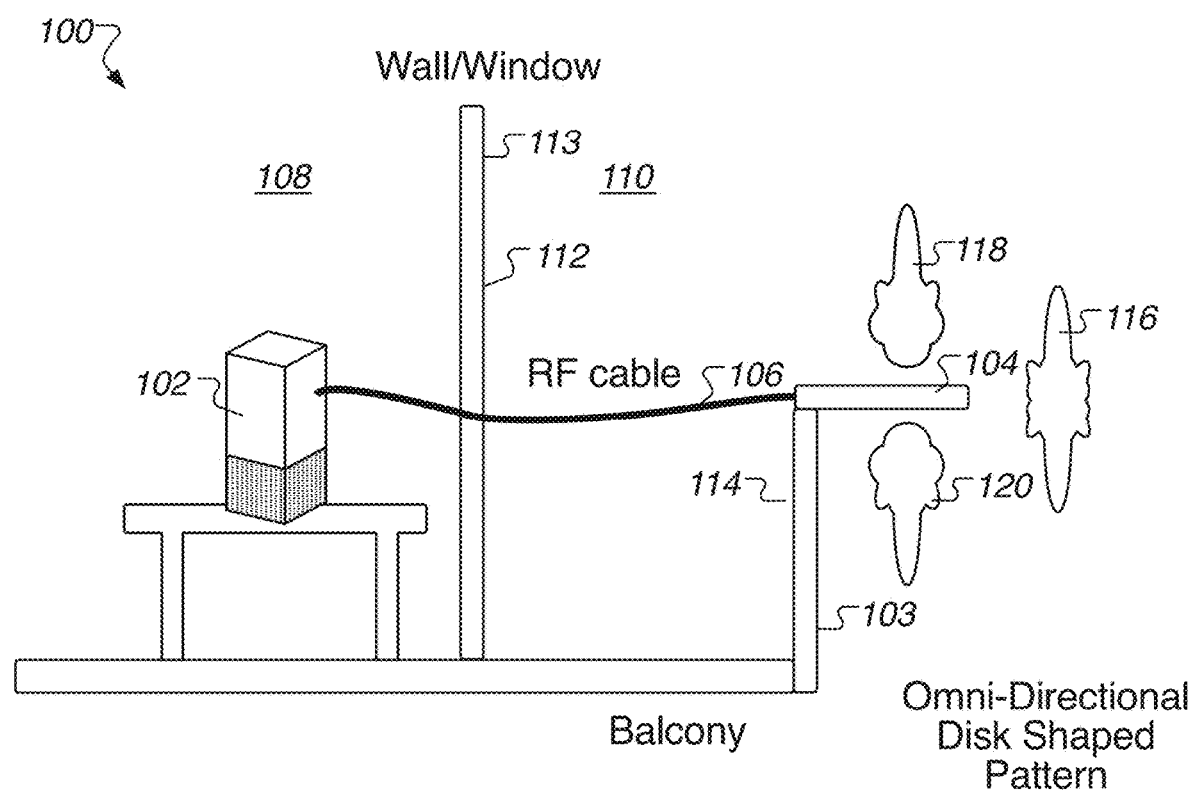
FIG. 1 is a diagram of a wireless network device with a surface-link antenna system mounted on an exterior surface of a building according to one embodiment.
Figure 1:
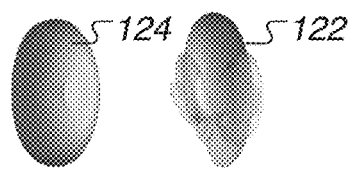

Technologies for wireless network devices with surface-link antenna systems mounted on exterior surfaces of buildings are described. One wireless network device includes a housing with a circuit board and a first external antenna port and an antenna carrier that is to be located outside of a building in which the housing is located. A processor, a first antenna, a first wireless local area network (WLAN) radio, and a second WLAN radio are disposed on the circuit board or within the housing. The first WLAN radio is coupled to the first antennas and communicates with a radio of a client device using the first antenna over a first wireless link (e.g., 2.4 GHz). The second WLAN radio is coupled to the first external antenna port, which is coupled to a second antenna in the antenna carrier, and communicates with a radio of a second wireless network device using the second antenna over a second wireless link (e.g., 5 GHz). The first wireless link may be a line-of-sight (LOS) link or a non-line-of-sight (NLOS) link within the building. The second wireless link is a LOS link that is external to the building.

For wireless communications, like WLAN, where the Equivalent Isotopically Radiated Power (EIRP) is limited for establishing a link between a transmitter and a receiver, certain RX power levels need to be assured to maintain desired throughput. For example, in the Wi-Fi® standard, the EIRP limit is 20 dBm and the RX power level needed is −66 dBm to ensure 5 GHz wireless link using the Wi-Fi® 11n modulation scheme MCS7 (150 Mbps) or −86 dBm to ensure 5 GHz wireless link using the Wi-Fi® modulation scheme MCS0 (15 Mbps) at 40 MHz bandwidth (single chain). Using the Friis Transmission equation (1) below, equation (2) sets forth the RX power ($P_R$) and equation (3) sets for the additional Loss Margin for the example above:

$$P_R = P_T + G_T + G_R + FSPL(20 \log_{10}(\lambda/4\pi d)) \quad (1)$$

$$P_R = 20 + 12 + (-58) = -26 \text{ dBm}(G_R = 12 \text{ dB and } FSPL = -58 \text{ dB for 3 meters}) \quad (2)$$

$$\text{Additional Loss Margin} = P_R - P_N = -26 - (-66) = 40 \text{ dB for MCS7, or 60 dB for MCS0} \quad (3)$$

If there is more than 40 dB additional loss in between TX/RX of 3 meter separation, the throughput of the MCS link will be lower. If the additional loss is more than 60 dB loss, the link can be lost or no link can be established.

Additional losses may come from floors, ceilings, and walls of a building. For high-rise buildings, the floor height is around 3 meters and the concrete floor loss is between 45 dB-65 dB at 5 GHz. Therefore, we face lower throughput links or no link between different floors.

The embodiments described herein utilize surface-link antenna architectures to address at least the problems described above. The embodiments described herein effectively move the WLAN wireless links (e.g., 5 GHz wireless links) outside a building, such as along an exterior surface of a building, while maintaining the electronics of the wireless network device indoors. The embodiments help avoid high RF losses of concrete buildings and can be used to establish WLAN links without the floor losses and wall losses. Previously, due to the losses of the walls and floors of a building, the mesh link configuration was the only option for establishing a network (e.g., multiple wireless network devices organized in a mesh network). The embodiments described herein are not limited to a mesh network only as described herein. The embodiments described herein may be used in different configurations, such as an AP-STA link configuration, a mesh link configuration, a hybrid link configuration, or the like.

In one implementation, the wireless network devices are installed inside of a building and connect two 5 GHz radios to surface-link antennas through RF cables to a balcony or an exterior wall of the building. With surface-link antennas mounted outside of the building, the wireless network devices establish a LOS link between surface-link antennas and bypass the floor loss. The surface-link antennas can be designed to have omnidirectional or directional radiation patterns with focused energy on an exterior surface of the building (e.g., disk or fan shaped radiation pattern). The disk/fan shaped beam patterns may help reduce interference and enhance signal strength along the building surface. The embodiments described herein also set forth various techniques to ensure enough isolation between radios to not desensitize other radios. The embodiments described herein also set forth network deployment scenarios, including AP-STA, Mesh, and hybrid configurations. The embodiments described herein also set forth channel assignment with corresponding deployment scenarios to avoid co-channel interference (CCI), adjacent-channel interference (ACI), and aggregate adjacent channel interference (AACI) problems.

FIG. 1 is a diagram of a wireless network device 102 with a surface-link antenna system 104 mounted on an exterior surface 103 of a building 100 according to one embodiment. The wireless network device 102 includes a processor and one or more WLAN radios. The wireless network device 102 includes one or more internal antennas that are disposed on a circuit board or within a housing of the wireless network device 102. In particular, a processor of the wireless network device 102 establishes one or more wireless links between a first WLAN radio and one or more client devices located within the building 100. The one or more wireless links established between radios of the wireless network device 102 and the client devices inside the building 100 can be LOS links within the room 108, as well as NLOS links through or around at least one wall or floor of the building 100.

The wireless network device 102 also includes one or more external antenna ports to connect to one or more antennas of the surface-link antenna system 104 via one or more RF cables 106. The wireless network device 102 is located inside a building 100, such as in a room 108 formed by an exterior wall 113 of the building 100. The surface-link antenna system 104 is located along an exterior surface of the building 100, such as on a balcony 110 outside the room 108. The surface-link antenna system 104 can be mounted on an exterior surface 103 of an exterior wall 114 of the balcony 110 or an exterior surface 112 of the exterior wall 113. The surface-link antenna system 104 can be located outside of the building 100 in other manners.

The surface-link antenna system 104 may include one or more multi-element antennas as described herein. The antenna(s) of the surface-link antenna system 104, when RF signals are applied, are configured to radiate electromagnetic energy focused along the exterior surface 103 of the building 100. In particular, a processor of the wireless network device 102 establishes one or more wireless links between a second WLAN radio and one or more other wireless network devices using the surface-link antenna system 104 located outside of the building 100. The one or more wireless links established between surface-link antennas can be LOS links outside of the building 100, such as along the exterior surface 103 of the building 100. The LOS links can bypass one or more floors of the building 100. In some cases, the wireless links outside of the building 100 may be partially obstructed and thus be NLOS links or partial LOS links. These NLOS links or partial LOS links can be caused by one or more objects or obstructions. These objects or obstructions are not a wall or a floor of the building 100. Rather, these objects may be canopies or other structures through which the radiation loss would be less than the radiation loss through a wall or a floor of the building 100. In one embodiment, the NLOS link is through an object that is not at least a wall or a floor of the building 100 or through an object whose radiation loss is less than the radiation loss through a wall or a floor of the building 100. The external wireless links may be made by radio transmissions across a path along the surface of the exterior surface between antennas, the path being either not obstructed, or if obstructed, by physicals objects that are not the floors/ceilings/walls of the building. Once a first wireless link between the wireless network device 102 and a client device is established and a second wireless link between the wireless network device 102 and a second wireless network device via the surface-link antenna system 104 is established, the wireless network device 102 can be used to deliver a content item to the client device (not illustrated in FIG. 1). For example, the processor of the wireless network device 102 receives a request for a content item from the client device via the first wireless link and sends the request for the content item to the second wireless device via the second wireless link when the content item is not stored at the wireless network device 102 already. The processor subsequently receives at least a portion of the content item from the second wireless device via the second wireless link and sends at least a portion of the content item to the client device via the first wireless link.

As illustrated in FIG. 1, the surface-link antenna system 104 can radiate electromagnetic energy focused along the exterior surface 103 of the building 100 using one or more directional radiation patterns or an omnidirectional radiation pattern. For example, a first directional radiation pattern 118 can extend up from the surface-link antenna system 104 and a second direction radiation pattern 120 can extend down from the surface-link antenna system 104. The first directional radiation pattern 118 and the second directional radiation pattern 120 can form a directional fan shaped pattern 124, as illustrated in FIG. 1. In another embodiment, an omnidirectional radiation pattern 116 can extend out from the surface-link antenna system 104 as an omnidirectional disk shaped pattern 122, as illustrated in FIG. 1. Alternatively, other radiation patterns may be used to establish wireless links outside of the building 100 using the surface-link antenna system 104. The details of the surface-link antenna system 104 are described in more detail below.

Figure 2:
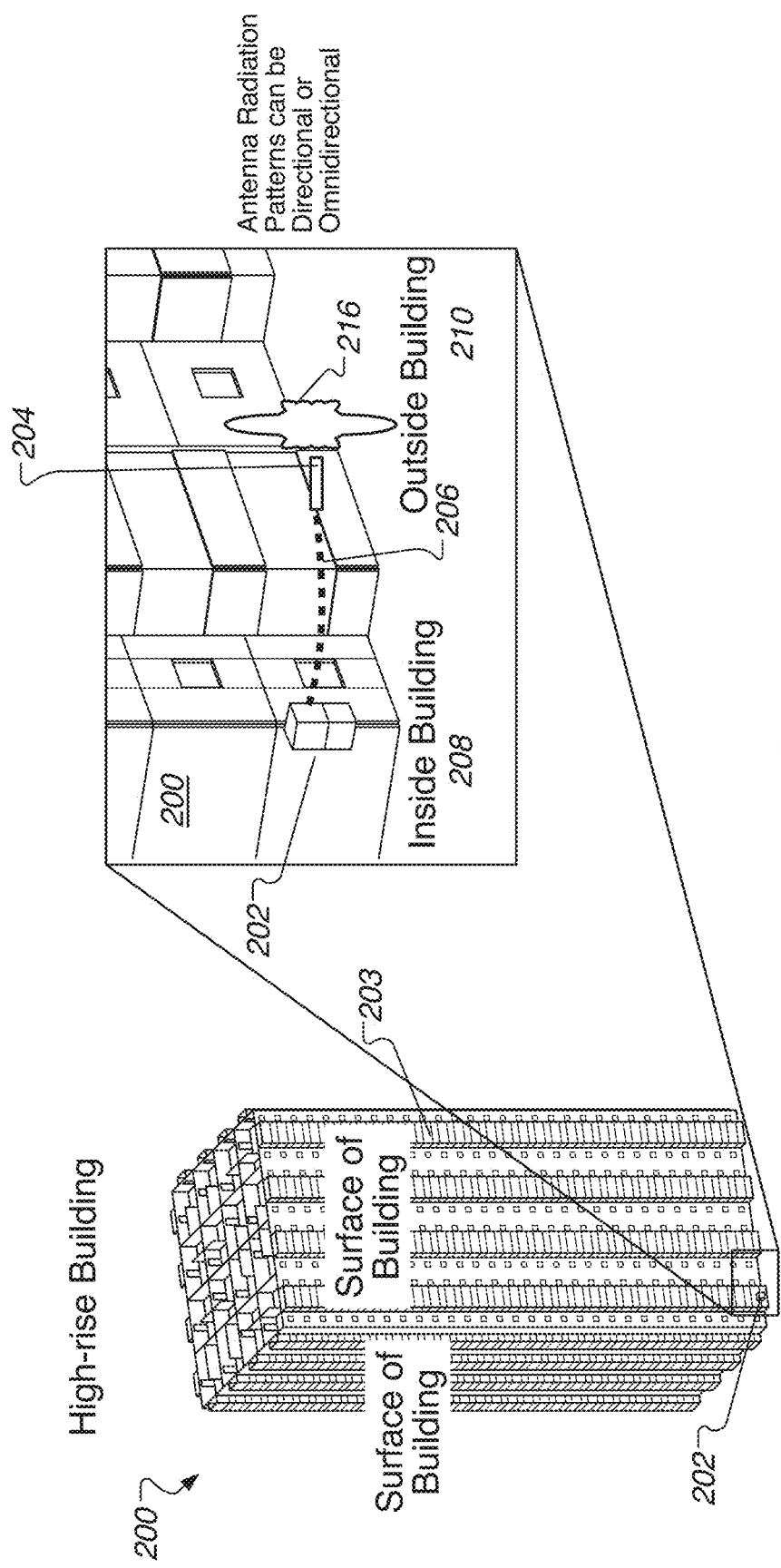
FIG. 2 is a diagram of a wireless network device located inside a high-rise building with a surface-link antenna system mounted on an exterior surface of the high-rise building according to one embodiment.

FIG. 2 is a diagram of a wireless network device 202 located inside a high-rise building 200 with a surface-link antenna system 204 mounted on an exterior surface 203 of the high-rise building 200 according to one embodiment. The wireless network device 202 is located inside 208 and is connected via RF cable 206 to the surface-link antenna system 204 that is located outside 210 the building 200. The surface-link antenna system 204 may be similar to the surface-link antenna system 104 described above with respect to FIG. 1. The surface-link antenna system 204 radiates electromagnetic energy in a radiation pattern 216. The radiation pattern 216 may be directional or omnidirectional. The wireless network device 202 establishes one or more wireless links with a second wireless network device also having a surface-link antenna system located outside 210 of the building 200. The radiation pattern(s) can be focused along the exterior surface 203 of the building 200 to establish a LOS link. Alternatively, the wireless link may not be a LOS link because of one or more minor obstructions that are less than would result in less radiation loss than one or more floors of the building 200.

As described above, for EIRP-limited wireless communications, a wireless link between a transmitter and a receiver needs a certain RX power level to maintain a desired throughput. The wireless network device 202 with the surface-link antenna system 204 can achieve higher RX power levels at the receivers than a wireless network device that uses an antenna that is located inside the building as shown with respect to FIG. 3.

Figure 3:
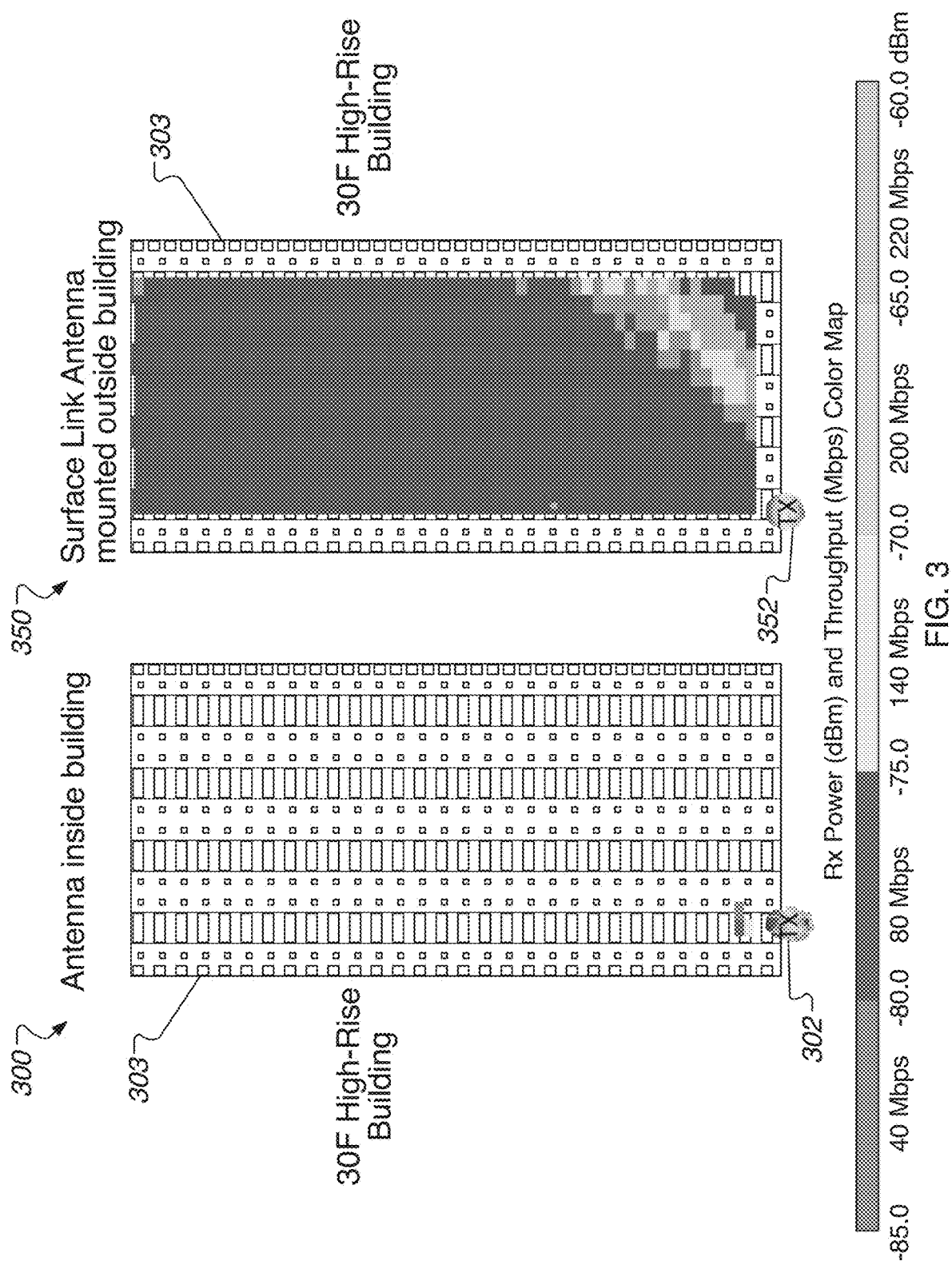
FIG. 3 illustrates a graph illustrating receive power (RX) power levels from an internal antenna of a wireless network device located within a building and a graph illustrating RX power levels from a surface-link antenna system of a wireless network device, the surface-link antenna system being mounted on an exterior surface of a building according to one embodiment.

FIG. 3 illustrates a graph 300 showing receive power (RX) power levels from an internal antenna of a wireless network device 302 located within a building and a graph 350 showing RX power levels from a surface-link antenna system of a wireless network device 352, the surface-link antenna system being mounted on an exterior surface 303 of a building according to one embodiment. FIG. 3 shows the comparison between the RX power levels at different floors using the different antenna systems. Graph 300 shows that a room that is one floor up can have a RX power level between −70 to −75 dB, achieving 140 Mbps, yet rooms on the same floor that are farther away laterally may not have sufficient RX power to establish a link with the wireless network device 302. Graph 300 also shows that the rooms located two floors up from the wireless network device 302 may have −75 to −80 dB or −80 to −85 dB, achieving 80 Mbps or 40 Mbps, respectively, or even less. In contrast, graph 350 shows that the RX power at most all floors at the exterior surface 303 can have greater than −85 dB, achieving at least 40 Mbps and the majority of floors have an RX level at −60 to −65 dB, achieving 220 Mbps.

Figure 4A:
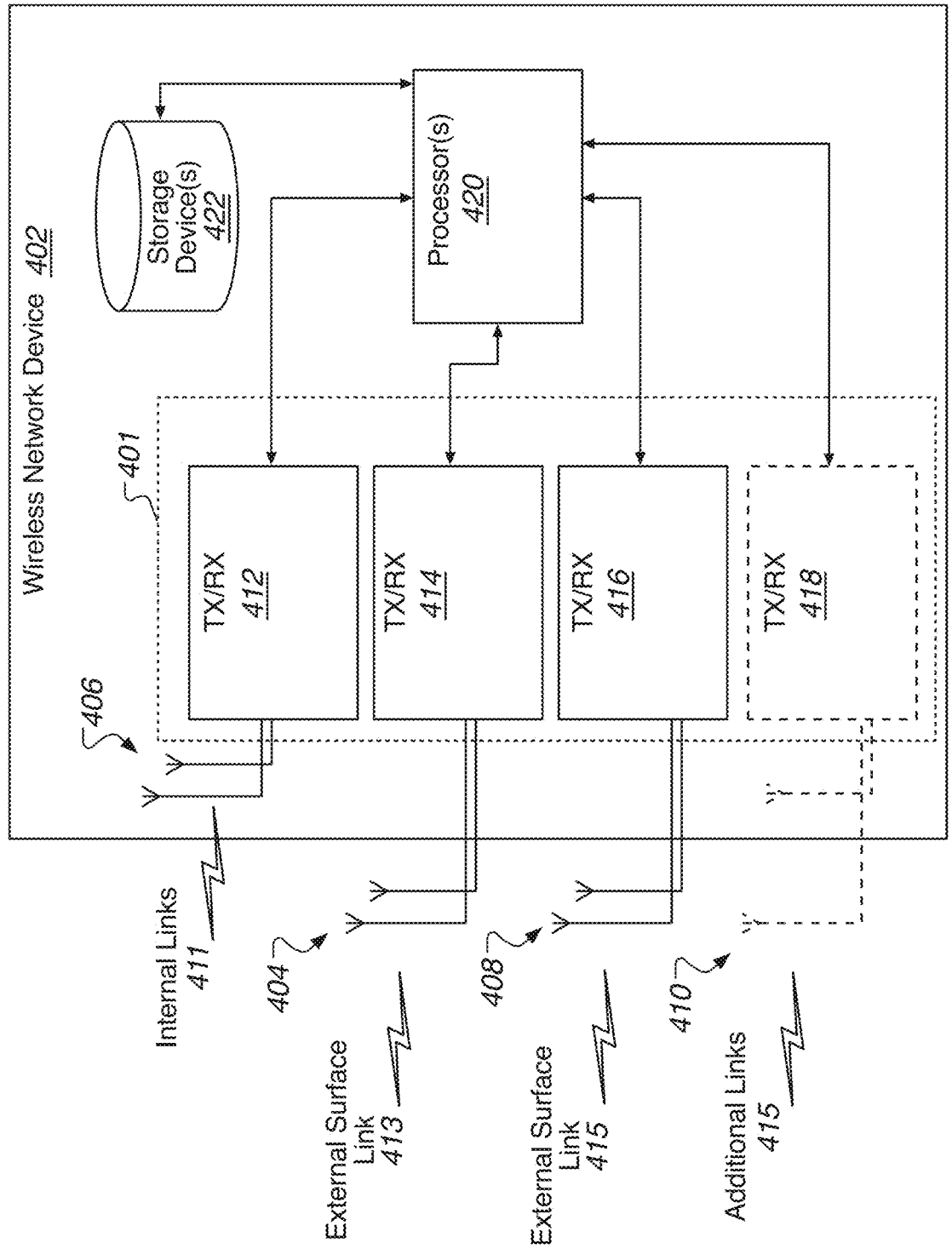
FIG. 4A is a block diagram of a wireless network device with multiple surface-link antennas according to one embodiment.

FIG. 4A is a block diagram of a wireless network device with multiple surface-link antennas according to one embodiment. The wireless network device 402 includes one or more processors 420, one or more storage devices 422, and a wireless communication subsystem 401. The wireless communication subsystem 401 includes a set of transceivers 412, 414, 416, and 418 coupled to a respective antenna (e.g., a single-element antenna elements or a multi-element antenna) or to multiple respective antennas. The set of transceivers 412, 414, 416, and 418 can be integrated into one or more radios as described herein. More specifically, the transceiver 412 is coupled to antenna(s) 406 to communicate over internal links 411. The internal links are LOS or NLOS links between devices located within a building. For example, the transceiver 412 can communicate with a client device via the antenna(s) 406 over an internal link 411. The transceiver 414 is coupled to antenna(s) 404 to communicate over an exterior surface link 413. Similarly, the transceiver 416 is coupled to antenna(s) 408 over an exterior surface link 415. As described herein, the exterior surface links 413, 415 are wireless links across the exterior surface of a building between antennas located outside of the building, while the respective housings of the wireless network devices are located inside of the building. The exterior surface links 413, 415 may be LOS links or NLOS links where the obstructing object has a radiation loss that is less than a floor or wall of the building. The wireless network device 402 may include zero or more additional transceiver(s) 418 coupled to one or more antennas 410 that are external to the building or internal to the housing of the wireless network device 402 and that communicate over one or more additional links 417. The one or more additional links 417 may be internal links, external links, or any combination thereof. The internal links 411 can be used for node-to-client (N2C) wireless connections, also referred to as "access." The exterior surface links 413, 415 can be used for point-to-point (P2P) wireless connections (also referred to as node-to-node (N2N) wireless connection), also referred to as "backhaul." The internal links 411 may also be used for some P2P wireless where wireless links can be established within the building.

Figure 4B:
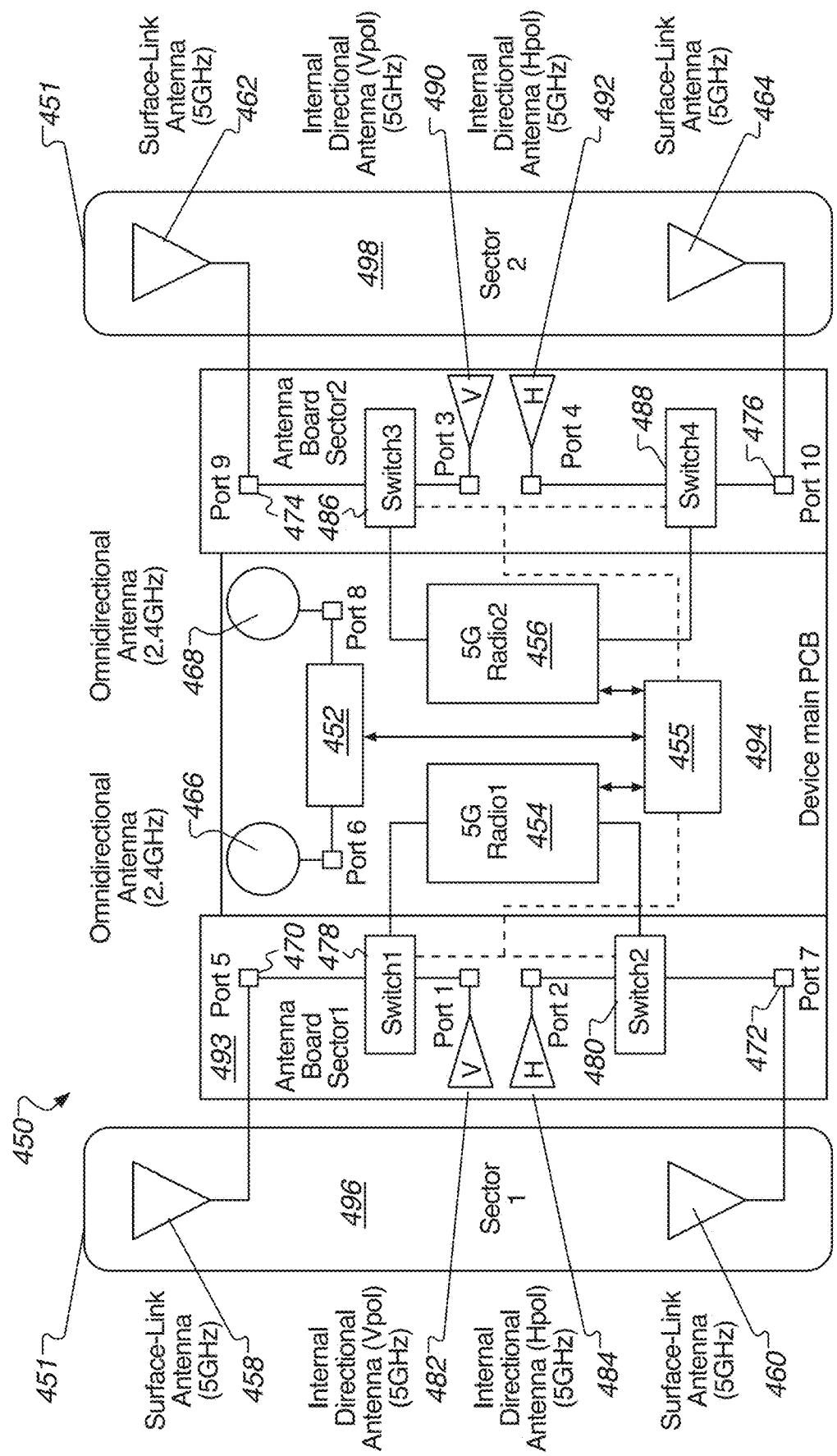
FIG. 4B is a block diagram of a wireless network device with multiple surface-link antennas according to another embodiment.

FIG. 4B is a block diagram of a wireless network device 450 with multiple surface-link antennas 451 according to another embodiment. The wireless network device 450 includes a first WLAN radio 452 (e.g., 2.4 GHz), a second WLAN radio 454 (e.g., 5 GHz), and a third WLAN radio 456 (e.g., 5 GHz), each coupled to a processor 455. These radios and processor can be disposed on a main PCB 494.

The wireless network device 450 also includes two omnidirectional antennas 466, 468 each coupled to the first WLAN radio 452. These two omnidirectional antennas 466, 468 may also be disposed as PCB antennas on the main PCB 494. The wireless network device 450 also includes a first antenna board 493 for a first sector and a second antenna board 495 for a second sector. A sector corresponds to one or more antennas through which one or more wireless links may be established for communication with a set of one or more other wireless network devices.

The wireless network device 450 includes a first internal directional antenna 482 and a second internal directional antenna 484 disposed on the first antenna board 493. The first internal directional antenna 482 has a first polarization (vertical polarization) and the second internal directional antenna 484 has a second polarization (horizontal polarization). The wireless network device 450 also includes a first switch 478 and a second switch 480 disposed on the first antenna board 493. The first switch 478 is coupled to the second WLAN radio 454 and two RF ports, including a first external antenna port 470. The first switch 478 is coupled to the first internal directional antenna 482 via one of the ports and coupled to a first surface-link antenna 458 that is mounted outside of the building. The second switch 480 is coupled to the second WLAN radio 454 and two RF ports, including a second external antenna port 472. The second switch 480 is coupled to the second internal directional antenna 484 via one of the ports and coupled to a second surface-link antenna 460 that is mounted outside of the building. The first surface-link antenna 458 and the second surface-link antenna 460 are considered one of the multiple surface-link antennas 451 for a first sector (sector 1) 496. The first surface-link antenna 458 and the second surface-link antenna 460 are disposed on an antenna carrier, the antenna carrier having a mount assembly with RF connectors and one or more PCBs, such as those described below with respect to FIGS. 9A-12A.

The wireless network device 450 includes a third internal directional antenna 490 and a fourth internal directional antenna 492 disposed on the second antenna board 495. The third internal directional antenna 490 has a first polarization (vertical polarization) and the fourth internal directional antenna 492 has a second polarization (horizontal polarization). The wireless network device 450 also includes a third switch 486 and a second switch 488 disposed on the second antenna board 495. The third switch 486 is coupled to the third WLAN radio 456 and two RF ports, including a third external antenna port 474. The first third 4868 is coupled to the third internal directional antenna 490 via one of the ports and coupled to a third surface-link antenna 462 that is mounted outside of the building. The fourth switch 488 is coupled to the third WLAN radio 456 and two RF ports, including a fourth external antenna port 476. The fourth switch 488 is coupled to the fourth internal directional antenna 492 via one of the ports and coupled to a fourth surface-link antenna 464 that is mounted outside of the building. The third surface-link antenna 462 and the fourth surface-link antenna 464 are considered another one of the multiple surface-link antennas 451 for a second sector (sector 2) 498. The third surface-link antenna 462 and the fourth surface-link antenna 464 are disposed on the same antenna carrier as the first surface-link antenna 458 and the second surface-link antenna 460. Alternatively, the third surface-link antenna 462 and the fourth surface-link antenna 464 are disposed in a separate antenna carrier.

In one embodiment, the switches 478, 480, 486, and 488 can be controlled via one or more control signals from the processor 455. For example, when the processor 455 detects that a respective surface-link antenna is plugged into the respective external antenna port, the respective switch can connect the surface-link antenna to the respective radio, instead of the respective internal directional antenna. The switches 478, 480, 486, and 488 can each operate in a first mode or a second mode. In the first mode, the switch selectively couples the respective WLAN radio to the respective surface-link antenna. In the second mode, the switch couples the respective WLAN radio to the respective internal directional antennas. The switches 478, 480, 486, and 488 can be controlled collectively or individually.

In one embodiment, the wireless network device 450 includes a housing with one or more circuit boards (e.g., main PCB 494 and two antenna boards 493, 495). The wireless network device 450 also includes one or more external antenna ports. The first WLAN radio 452 communicates with a radio of a client device using one or both of the omnidirectional antennas 466, 468 over a first wireless link. The antenna carrier may include the surface-link antennas for sector 1 and sector 2 and can be located outside of a building in which the housing is located. The second WLAN radio 454 can communicate with a radio of a second wireless network device using one or both of the surface-link antennas 458, 460 over a second wireless link. The third WLAN radio 456 can communicate with a radio of a third wireless network device using one or both of the surface-link antennas 462, 464 over a third wireless link. In another embodiment, the third WLAN radio 456 can communicate with the radio of the second wireless network device using one or both of the surface-link antennas 462, 464 over the second wireless link or a third wireless link. The second wireless link (and the third wireless link) is a LOS link that is external to the building. In one embodiment, the first surface-link antenna 458 and second surface-link antenna 460 are to radiate electromagnetic energy with a first directional radiation pattern (e.g., first disk shape pattern in a first direction) and the third surface-link antenna 462 and the fourth surface-link antenna 464 are to radiate electromagnetic energy with a second directional radiation pattern (e.g., second disk shape pattern in a second direction that is different than the first direction). In another embodiment, the first surface-link antenna 458, the second surface-link antenna 460, the third surface-link antenna 462, and the fourth surface-link antenna 464 are to radiate electromagnetic energy with an omnidirectional radiation pattern (e.g., disk shape pattern).

In one embodiment, the second WLAN radio 454 is a first 2×2 MIMO radio with a first MIMO port and a second MIMO port, the first MIMO port being coupled to the first external antenna port 470 and the second MIMO port being coupled to a second external antenna port 472 of the housing. A first surface-link antenna 451 includes a first element to couple to the first external antenna port 470 and a second element to couple to the second external antenna port 472. The first 2×2 MIMO radio communicates with the radio of the second wireless network device over the second wireless link using the first surface-link antenna 451. In a further embodiment, the third WLAN radio 456 is also a second 2×2 MIMO radio with a third MIMO port and a fourth MIMO port, the third MIMO port being coupled to a third external antenna port 474 and the fourth MIMO port being coupled to a fourth external antenna port 476. A second surface-link antenna 451 includes a third element to couple to the third external antenna port 474 and a fourth element to couple to the fourth external antenna port 476. The second 2×2 MIMO radio communicates with a radio of a third wireless network device using the second surface-link antenna 451 over a third wireless link or with the radio of the second wireless network device using the second and third antennas over the second wireless link. Like the second wireless link, the third wireless link is a LOS link that is external to the building.

Figure 5:
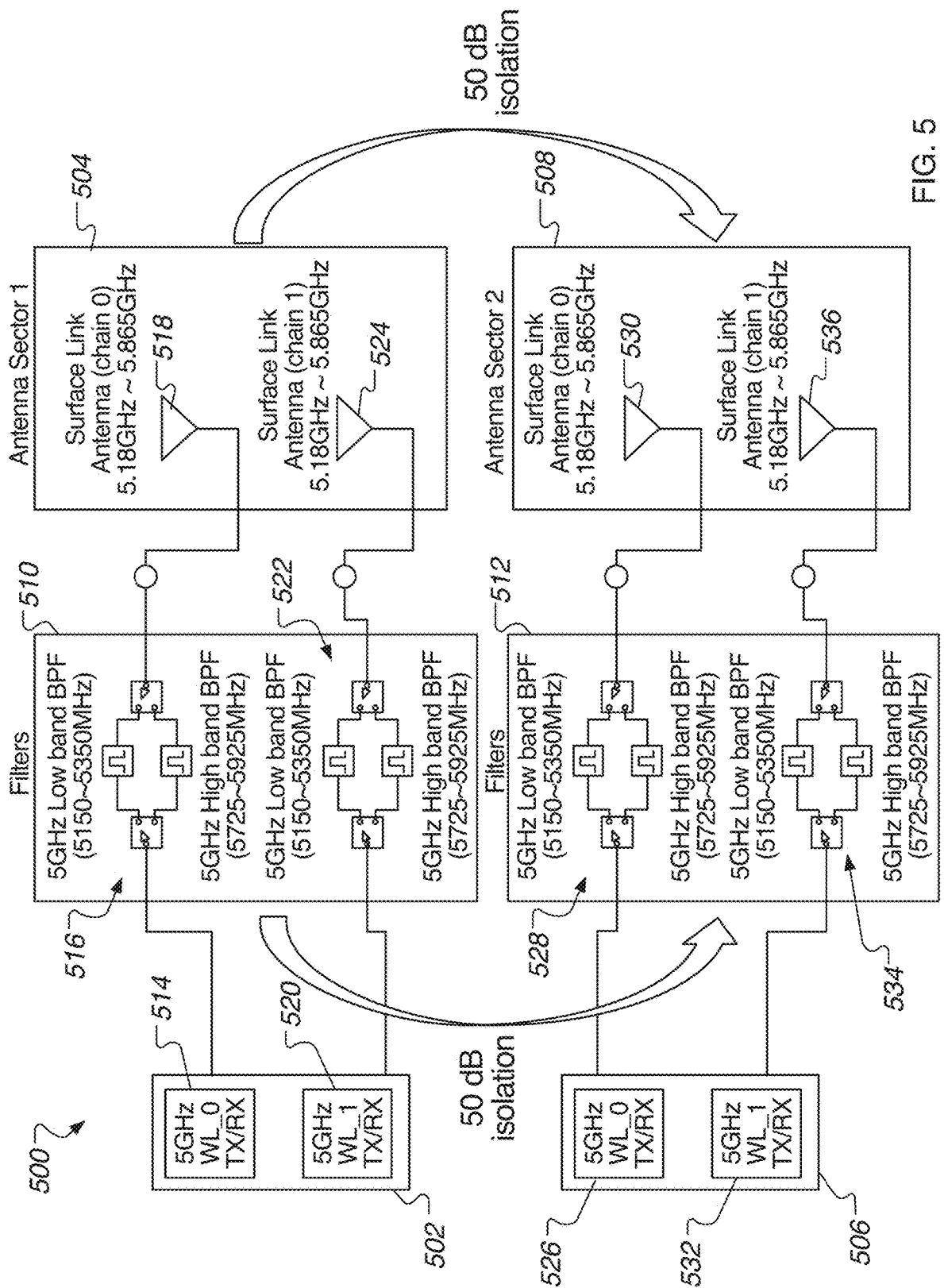
FIG. 5 is a block diagram is a block diagram of wireless network device including two 2×2 multiple-input-multiple-output (MIMO) radios, multiple filter circuits, and two multi-element surface-link antennas according to one embodiment.

FIG. 5 is a block diagram of wireless network device 500 including two 2×2 multiple-input-multiple-output (MIMO) radios 502, 506, multiple filter circuits 516, 522, 528, 534, and two multi-element surface-link antennas 504, 508 according to one embodiment. The first 2×2 MIMO radio 502 includes a first transceiver 514 and a second transceiver 520. A first multi-element surface link antenna 504 for a first antenna sector (sector 1) includes a first antenna element 518 (for chain 0) and a second antenna element 524 (for chain 1). The first filter circuit 516 is coupled between the first transceiver 514 (corresponding to a first MIMO port) of the first MIMO radio 502. The second filter circuit 522 is coupled between the second transceiver 520 (corresponding to a second MIMO port) of the first MIMO radio 502. The third filter circuit 528 is coupled between the first transceiver 526 (corresponding to a first MIMO port) of the second MIMO radio 506. The fourth filter circuit 534 is coupled between the second transceiver 532 (corresponding to a second MIMO port) of the second MIMO radio 506. Each of the filter circuits may include a pair of switches, a first band pass filter (BPF) for a first frequency range (e.g., 5.15 GHz to 5.35 GHz) and a second BPF for a second frequency range (e.g., 5.725 GHz to 5.925 GHz). The pair of switches can be controlled to select the first BPF for the first frequency range or the second BPF for the second frequency range. The first filter circuit 516 and the second filter circuit 522 are configured to filter RF signals within a first frequency for the first surface-link antenna 504 while the second filter circuit 528 and fourth filter circuit 534 are configured to filter RF signals within the second frequency range for the second surface-link antenna 508. As described herein, to avoid AACI, the isolation between two concurrent operating 5 GHz radios is approximately 70 dB. In the RF front-end design filters, such as those described with respect to FIG. 5 can provide approximately 50 dB isolation. For example, filters for sector 1 and filters for sector 2 can be switched to different bands of BPFs to provide the 50 dB isolation between the two sectors. The first surface-link antenna 504 and the second surface-link antenna 508 can be designed to have approximately 20 dB isolation or more. The band pass filtering for two separate channels and the antenna designs can be done to avoid AACI for concurrent operation of the two MIMO radios 502, 506. Alternatively, the two 2×2 MIMO radios 502, 506 can be operating non-concurrently as well.

Figure 6:
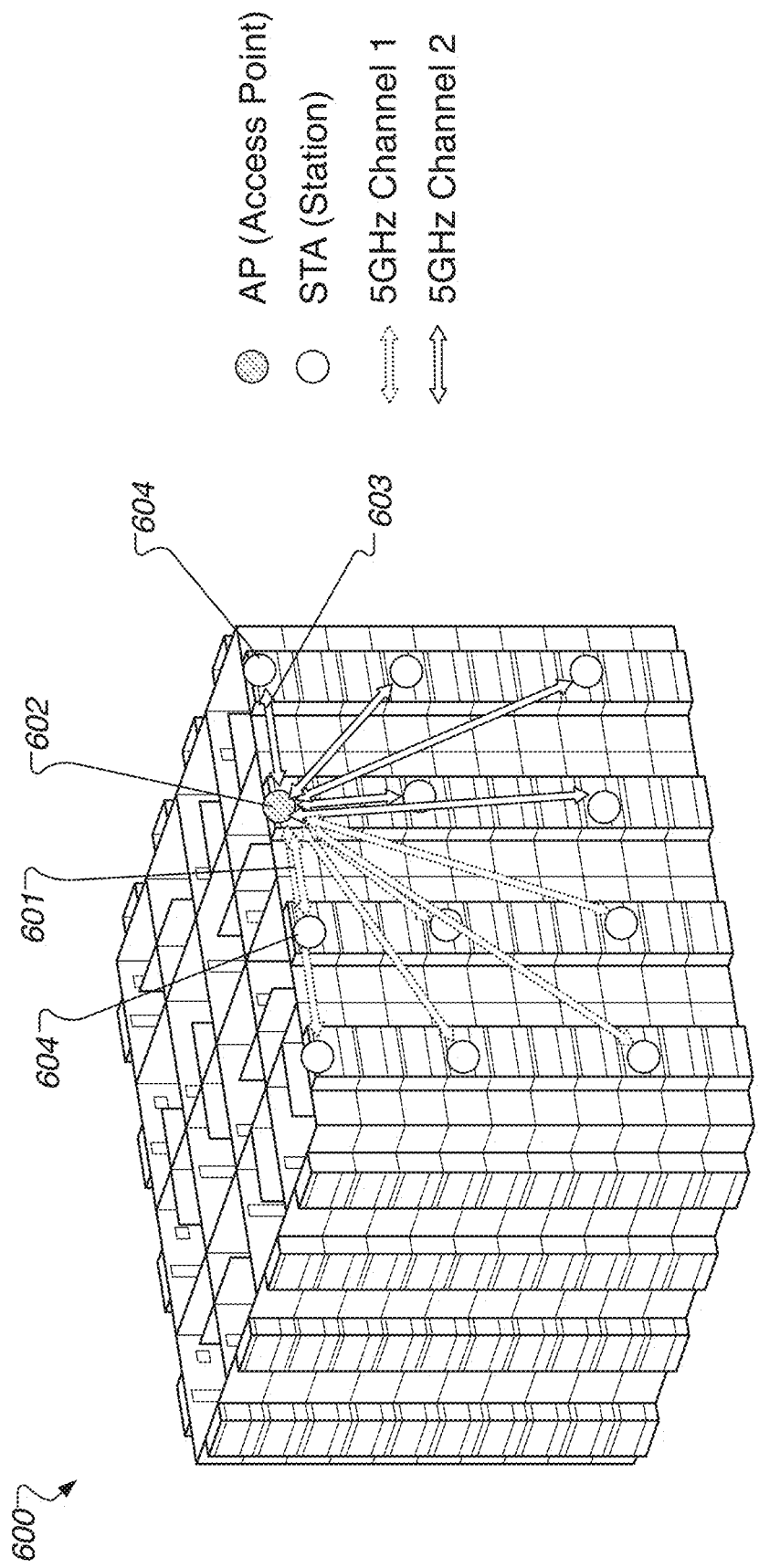
FIG. 6 is a diagram illustrating multiple wireless network devices in an access point (AP) and station (STA) (AP-STA) link configuration according to one embodiment.

FIG. 6 is a diagram illustrating multiple wireless network devices in an access point (AP) and station (STA) link (hereinafter AP-STA link) configuration 600 according to one embodiment. In the AP-STA link configuration 600, one wireless network device is an AP 602 and the other wireless network devices are stations 604. In the AP-STA link configuration 600, all traffic goes through the AP 602 with dual concurrent radios with a first channel 601 (channel 1) and a second channel 603 (channel 2) through the different antenna sectors of the AP 602. For example, as illustrated in FIG. 6, the AP 602 communicates with a first set of one or more stations 604 over the first channel 601 and with a second set of one or more stations 604 over the second channel 603.

Figure 7:
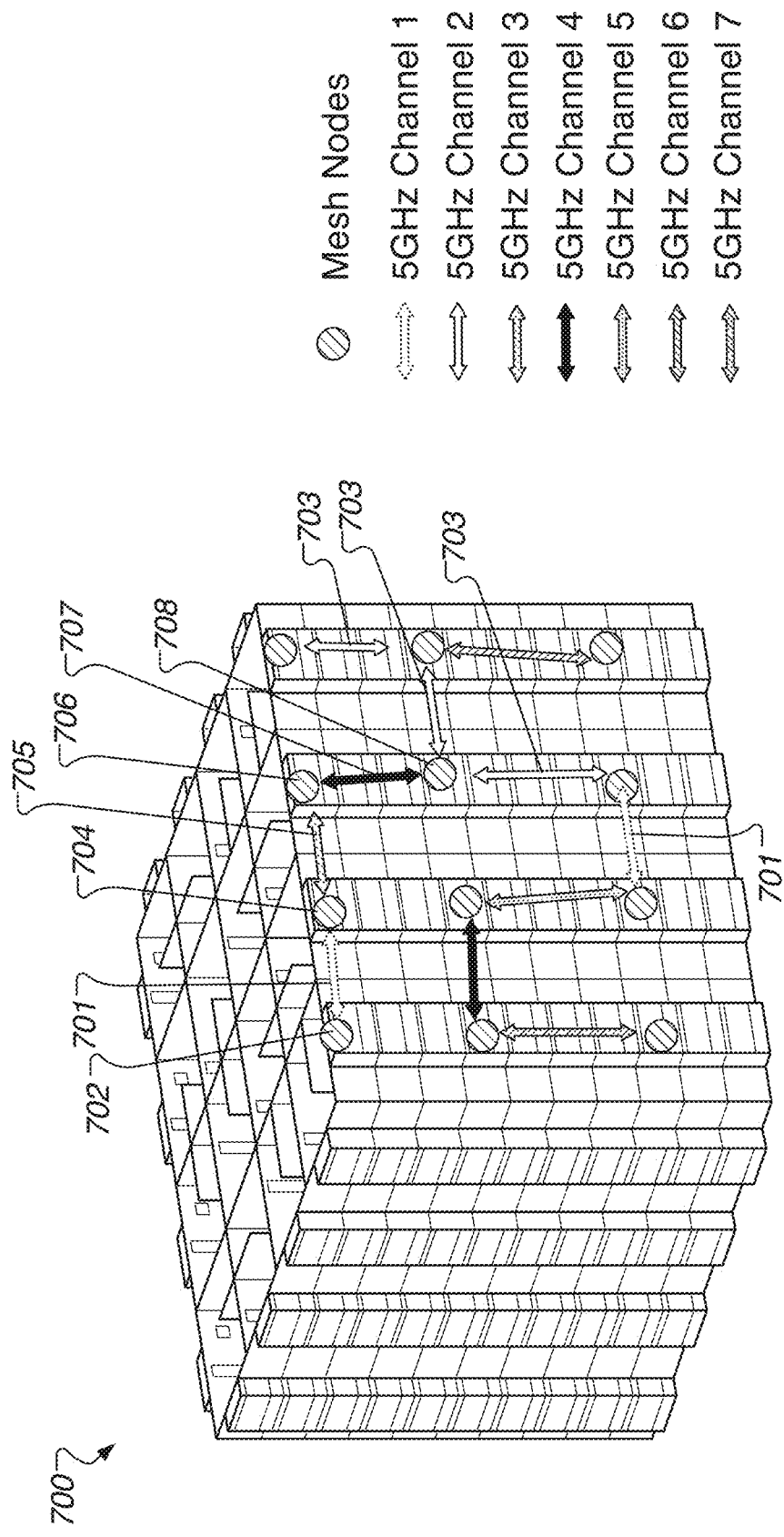
FIG. 7 is a diagram illustrating multiple wireless network devices in a mesh link configuration according to one embodiment.

FIG. 7 is a diagram illustrating multiple wireless network devices in a mesh link configuration 700 according to one embodiment. In the mesh link configuration 700, each of the wireless network devices is a mesh node. In the mesh link configuration 700, the mesh nodes establish links through dual concurrent radios with different channels. Each mesh node can have two different sectors with two different channels. The channels can be assigned to avoid CCI, ACI, and/or AACI. As illustrated in FIG. 7, a first mesh node 702 communicates with a second mesh node 704 over a first channel 701. The second mesh node 704 communicates with a third mesh node 706 over a third channel 705. The third mesh node 706 communicates with a fourth mesh node 708 over a fourth channel 707. The mesh nodes can communicate with more than one other mesh node on a channel, such as illustrated by the fourth mesh node 708 that communicates with two other mesh nodes over a second channel 703. The mesh network can be established between different mesh nodes in different configurations based on channel assignments.

Figure 8:
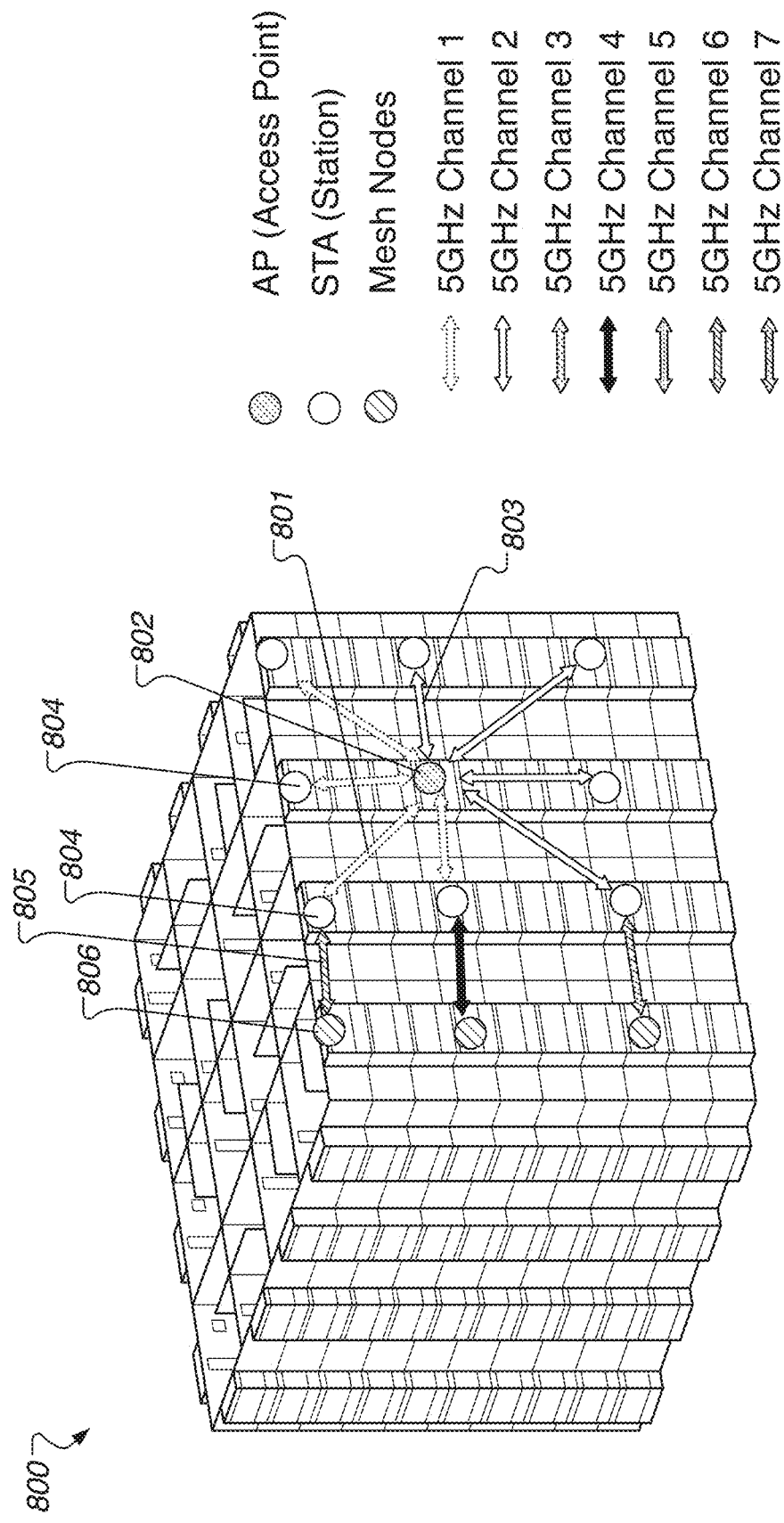
FIG. 8 is a diagram illustrating multiple wireless network devices in a hybrid link configuration according to one embodiment.

FIG. 8 is a diagram illustrating multiple wireless network devices in a hybrid link configuration according to one embodiment. In the hybrid link configuration 800, each of the wireless network devices is a mesh node. In the hybrid link configuration 800, one or more wireless network devices can be Aps, such as AP 802 that communicates with multiple stations 804, such as illustrated and described with respect to the AP-STA link configuration 600 of FIG. 6. Some of the stations 804 and/or other wireless network devices can be mesh nodes 806 that communicate with one or more two other mesh nodes or stations, as illustrated in FIG. 8. In the hybrid link configuration 800, most traffic goes through the AP 802 with dual concurrent radios with channel 1 and channel 2. However, nodes that are farther away from the AP 802 can be linked through mesh nodes 806 with different channels, such as channels 3-7. The channels can be assigned to avoid CCI, ACI, and/or AACI.

As described herein, the two surface-link antennas can be integrated into an antenna carrier with a mount assembly and one or more PCBs. The two surface-link antennas can be designed to have approximately 20 dB isolation or more. Described below with respect to FIGS. 9A-13 are four antenna designs with more than 20 dB isolation.

In one embodiment, each of the first and second surface-link antennas may be rectangular in shape, formed on a PCB (such as a microstrip PCB), and may each be an antenna pair, such as a pair of phased array patch antennas. Each of the antenna pair can include one or more elements, such as 4-element patch antenna array illustrated in FIG. 9A, a 4-element printed dipole antenna array illustrated in 10A, an 8-element patch antenna array illustrated in FIG. 11A, and an 8-element printed dipole antenna array illustrated in FIG. 12A. Alternatively, other multi-element antennas may be used for the surface-link antennas.

FIG. 9A is perspective view of an antenna carrier 900 with a pair of directional antennas, each with a 4-element patch antenna array 902 on a top layer 904 of a printed circuit board (PCB) 906 and a feed network 908 on a bottom layer 910 of the PCB 906 according to one embodiment. FIG. 9B illustrates a top view and a bottom view of one of the directional antennas of FIG. 9A. The antenna carrier 900 includes a mount assembly 912 having a first elongated housing in which a first surface-link antenna of the pair is disposed, a second elongated housing in which a second surface-link antenna of the pair is disposed. The antenna carrier 900 also includes four RF connectors 914 that couple to a respective RF cable (not illustrated). The RF connectors 914 may be SMA connectors. Alternatively, other types of connectors may be used. The antenna carrier 900 may also include a hinge 916 that can adjust a relative angle between a first plane of a first PCB in the first housing and a second plane of a second PCB in the second housing.

In the depicted embodiment, the first surface-link antenna includes a first PCB with four patch elements 902 connected electrically in parallel with a first set of metal lines (feed network 908). Each of the four patch elements is located in a first plane of the first PCB. The second surface-link antenna includes a second PCB comprising four patch elements connected in parallel with a second set of metal lines. In one embodiment, the dimensions of one of the PCB antennas are approximately 166 mm×34 mm×1.6 mm. Alternatively, other dimensions may be used. It should be noted that FIG. 9B illustrates the top layer 904 and the bottom layer 910 of one of the two PCBs, but the other PCB would have the same design.

In one embodiment, two phased array patch antennas are disposed on individual PCBs. Alternatively, the two phased array patch antennas are disposed on the same rigid PCB or one or more flexible PCBs. The PCB 906 may be rectangular and fit within the recessed region of the housings. The phased array patch antenna may include a series of patch elements, e.g., in this case four patch elements: a first patch element, a second patch element, a third patch element, and a fourth patch element. The four patch elements is aligned along a first axis and is dual fed with two sets of metal lines, a first set containing a first RF feed and a second set containing a second RF feed. Each of the first RF feed and the second RF feed is coupled to a radio on the main circuit board via one or more RF cables as described herein. More specifically, the four patch elements may be conductive and electrically connected in parallel with a first set and a second set of metal lines. The four patch elements may be coupled to a ground (not illustrated) through the back of the PCB 906. The first set of metal lines, located on a first side of the four patch elements, includes a first metal line to connect the first patch element and the second patch element (e.g., a first pair of patch elements), and a second metal line to connect the third patch element and the fourth patch element (e.g., a second pair of patch elements). A third metal line connects the first metal line and the second metal line together, and the first RF feed may be disposed approximately at a center of the third metal line.

The second set of metal lines, located on a second side of the four patch elements, includes a fourth metal line to connect the first patch element and the second patch element, and a fifth metal line to connect the third patch element and the fourth patch element. A sixth metal line may connect the fourth metal line and the fifth metal line together, and the second RF feed may be disposed approximately at a center of the fifth metal line. More specifically, the first set of metal lines (along the left of the four patch elements) and the four patch elements form a first antenna that radiates electromagnetic energy with a first polarization pattern of a first slant polarization (approximately positive 45 degrees) and the second set of metal lines (along the right of the patch elements) and the four patch elements form a second antenna that radiates electromagnetic energy with a second polarization pattern at a second slant polarization (approximately negative 45 degrees), which together cumulatively form a cross-polarization radiation pattern. The combination of the first antenna and the second antenna provides full benefits of a multiple input multiple output (MIMO) antenna, although other single input and single output antennas may also be deployed within each chamber. By transmitting and receiving on dual-channels and dual-streams provided by MIMO architecture, throughput may be higher and a lower envelope correlation coefficient (ECC) is achievable, which provides better quality and stronger simultaneous radiation patterns of the co-located first antenna and second antenna.

In one embodiment, the mount assembly 912 is a metal housing. Because the metal mount assembly 912 is longer than it is wide and the PCB 906 is elongated along the longitudinal axis, the cross-polarization radiation pattern that is created is relatively flat, e.g., shaped like a fin. For example, the length ($L_1$) may be substantially longer than the width ($W_1$) and the center-to-center distance ($D_1$) between the two sets of patch elements may be sized to reduce amount of gain drop off. In one embodiment, by way of example, the length may be 166 mm, the width 34 mm, and the distance between the two sets of patch elements may be 40 mm. The center-to-center distance ($D_1$) may, for example, be sized to less than the length of one wavelength of the frequency of the electromagnetic radiation emitted by the phased array patch antenna.

With still more specificity as to the first set of metal lines, being exemplary of also the second set of metal lines, the first metal line includes multiple portions: a first portion extending from the first patch element in a first direction to a first end; a second portion extending from the first end in a second direction to a second end; and a third portion extending from the second end in a third direction to the second patch element. The second portion may taper from the first end and the second end to a first center of the second portion, and the first end and the second end may each include a clipped corner. The second metal line includes multiple portions: a fourth portion extending from the third patch element in the first direction to a third end; a fifth portion extending from the third end in the second direction to a fourth end; and a sixth portion extending from the fourth end in the third direction to the fourth patch element. The fifth portion may taper from the third end and the fourth end to a second center of the fifth portion, and the third end and the fourth end may each include a clipped corner. A third metal line includes multiple portions: a seventh portion extending from the first center of the second portion in the first direction to a fifth end; an eighth portion extending from the fifth end in the second direction to a sixth end; and a ninth portion extending from the sixth end in the third direction to the second center of the fifth portion. The eighth portion may taper from the fifth end and the sixth end to a third center of the eighth portion, and each of the fifth end and the sixth end may include a clipped corner. The first RF feed is disposed at approximately the third center of the eighth portion, and a first radio is coupled to the first RF feed.

The detailed description of the first set of metal lines (e.g., the first metal line, the second metal line, and the third metal line) applies equally to the second set of metal lines (e.g., the fourth metal line, fifth metal line, and sixth metal line), which are disposed symmetrically at the right sides of the four patch elements.

Figure 9C:
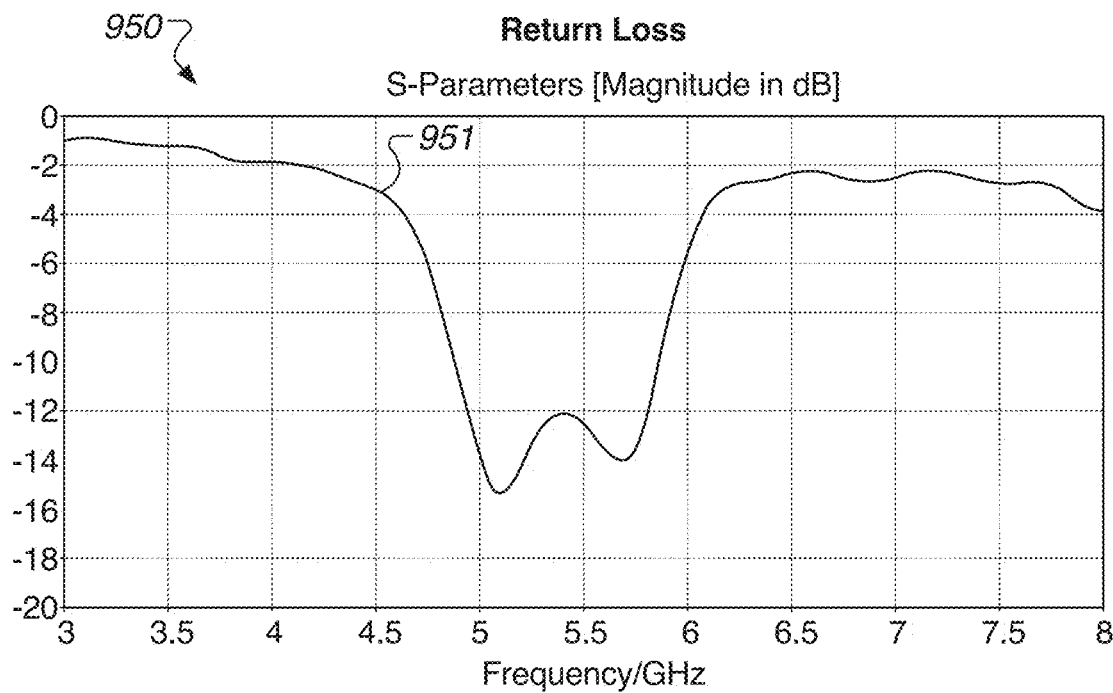
FIG. 9C is a graph of a return loss of the directional antenna of FIG. 9A according to one embodiment.

FIG. 9C is a graph 950 of a return loss 951 of the directional antennas of FIG. 9A according to one embodiment. The graph 950 illustrates that the directional antennas can be caused to radiate electromagnetic energy between approximately 4.6 GHz to approximately 6 GHz.

Figure 9D:
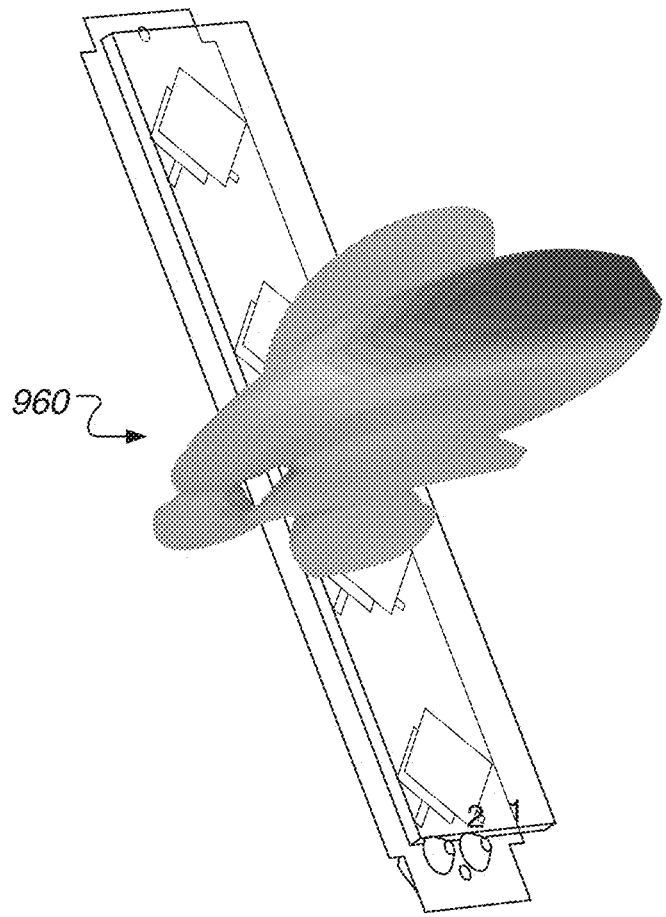
FIG. 9D illustrates a directional radiation pattern of the directional antenna of FIG. 9A according to one embodiment.

FIG. 9D illustrates a directional radiation pattern 960 of the directional antennas of FIG. 9A according to one embodiment. As described herein, the first surface-link antenna, in response to RF signals from the second WLAN radio, radiates electromagnetic energy with a first cross-polarization radiation pattern in a first direction away from a first plane of the first PCB, and the second surface-link antenna, in response to RF signals from the fourth WLAN radio, radiates electromagnetic energy with a second cross-polarization radiation pattern in the first direction away from a second plane of the first PCB. The first and second cross-polarization radiation patterns result in the directional radiation pattern 960 illustrated in FIG. 9D.

Figure 10B:
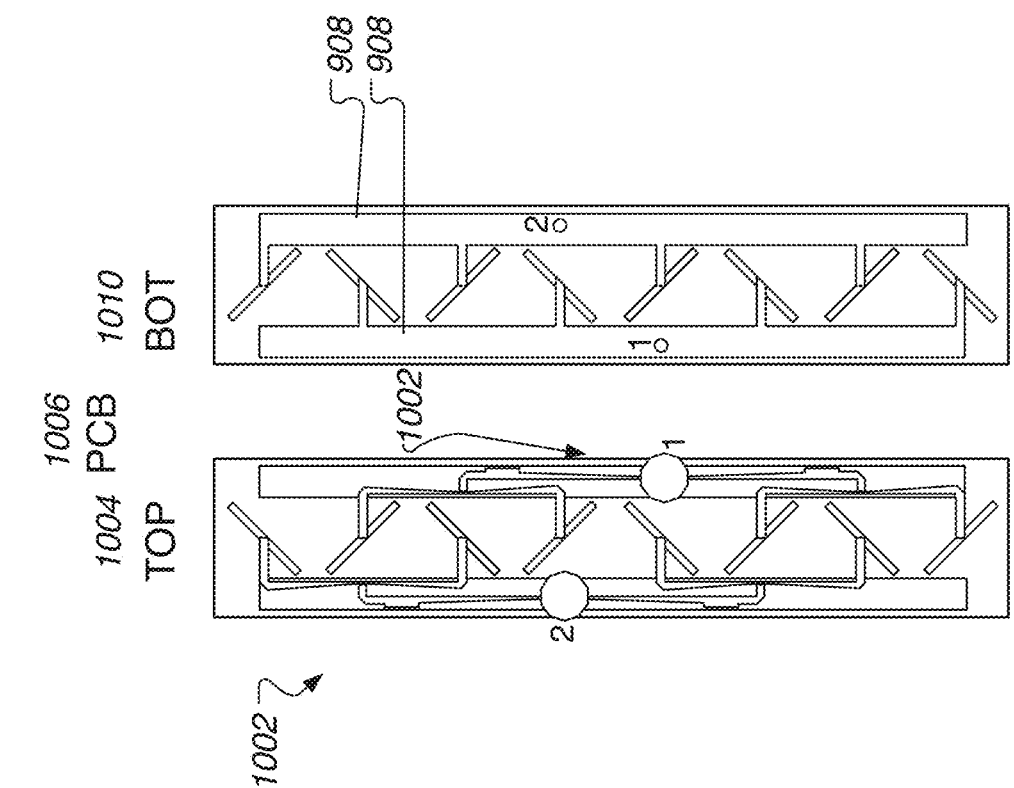
FIG. 10B illustrates a top view and a bottom view of the omnidirectional antenna of FIG. 10A according to one embodiment.
Figure 10A:
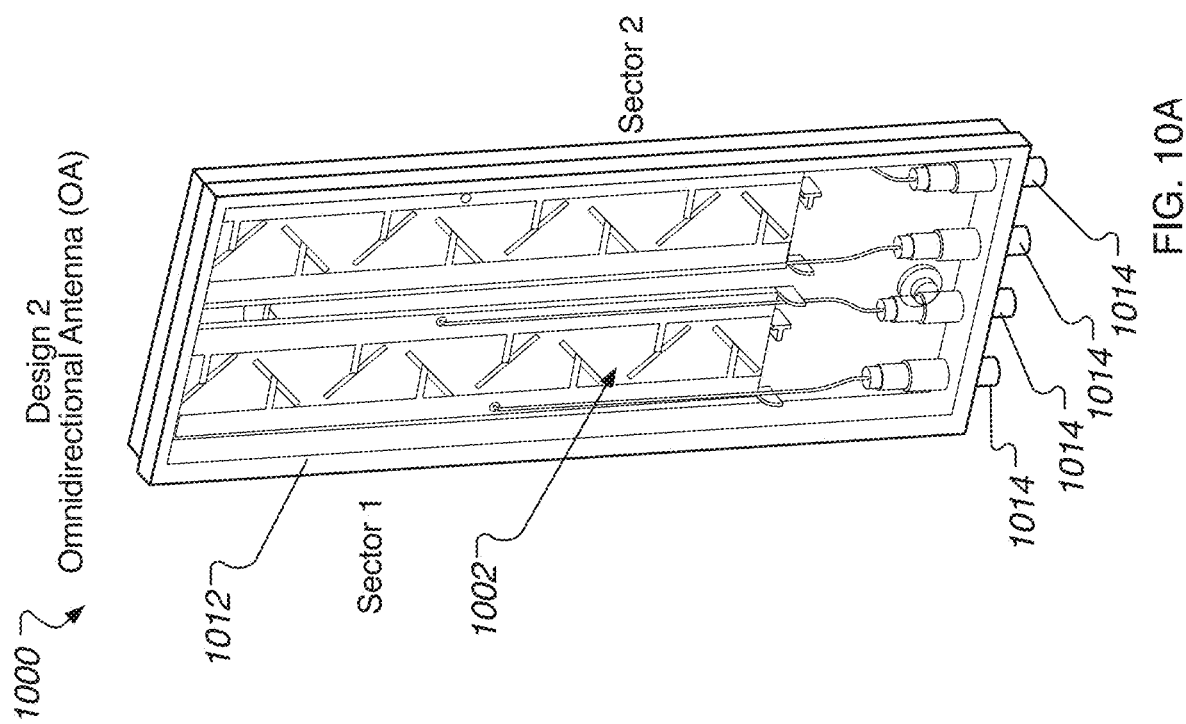
FIG. 10A is perspective view of an omnidirectional antenna with a 4-element printed dipole antenna array on a top layer of a PCB and a feed network on a bottom layer of the PCB according to one embodiment.

FIG. 10A is perspective view of an antenna carrier 1000 with a pair of omnidirectional antennas, each with a 4-element printed dipole antenna array 1002 on a top layer 1004 of a PCB 1006 and a feed network 1008 on a bottom layer 1010 of the PCB 1006 according to one embodiment. FIG. 10B illustrates a top view and a bottom view of one of the omnidirectional antennas of FIG. 10A. The antenna carrier 1000 includes a mount assembly 1012 having an elongated housing in which a pair of surface-link antennas is disposed. The antenna carrier 1000 also includes four RF connectors 1014 that couple to a respective RF cable (not illustrated). The RF connectors 1014 may be SMA connectors. Alternatively, other types of connectors may be used. In this embodiment, the antenna carrier 1000 does not include a hinge because the radiating elements of the surface-link antennas are mounted on the top layer 1004 (first plane) of the PCB 1006. In another embodiment, the some radiating element can be disposed on the top layer 1004 (first plane) and other radiating elements can be disposed on the bottom layer 1010 (second plane) of the PCB 1006. The first plane and the second plane are parallel to each other.

In the depicted embodiment, the mount assembly 1012 may include one or two PCBs or two portions of a single PCB. In the depicted embodiment of two PCBs, a first PCB includes a first surface-link antenna and a second PCB includes a second surface link antennas. The first surface-link antennas includes a first set of dipole elements disposed on the first PCB and connected electrically in parallel with a first set of metal lines and a second set of dipole elements disposed on the first PCB and connected electrically in parallel with a second set of metal lines. The second surface-link antenna includes a third set of dipole elements disposed on the second PCB and connected electrically in parallel with a third set of metal lines and a fourth set of dipole elements disposed on the second PCB and connected electrically in parallel with a fourth set of metal lines.

In one embodiment, the dimensions of one of the PCB antennas are approximately 160 mm×32 mm×0.8 mm. Alternatively, other dimensions may be used. It should be noted that FIG. 10B illustrates the top layer 1004 and the bottom layer 1010 of one of the two PCBs, but the other PCB would have the same design.

In one embodiment, two phased array patch antennas are disposed on individual PCBs. Alternatively, the two phased array patch antennas are disposed on the same rigid PCB or one or more flexible PCBs. The PCB 1006 may be rectangular and fit within the recessed region of the mount assembly 1012. The phased array patch antenna may include a series of printed dipole elements, e.g., in this case four printed dipole elements: The printed dipole elements can reduce the form factor of the antenna carrier. Alternatively, other antenna designs may be used, such as dipole antennas that are not disposed on the same plane as illustrated in FIG. 10B.

Figure 10C:
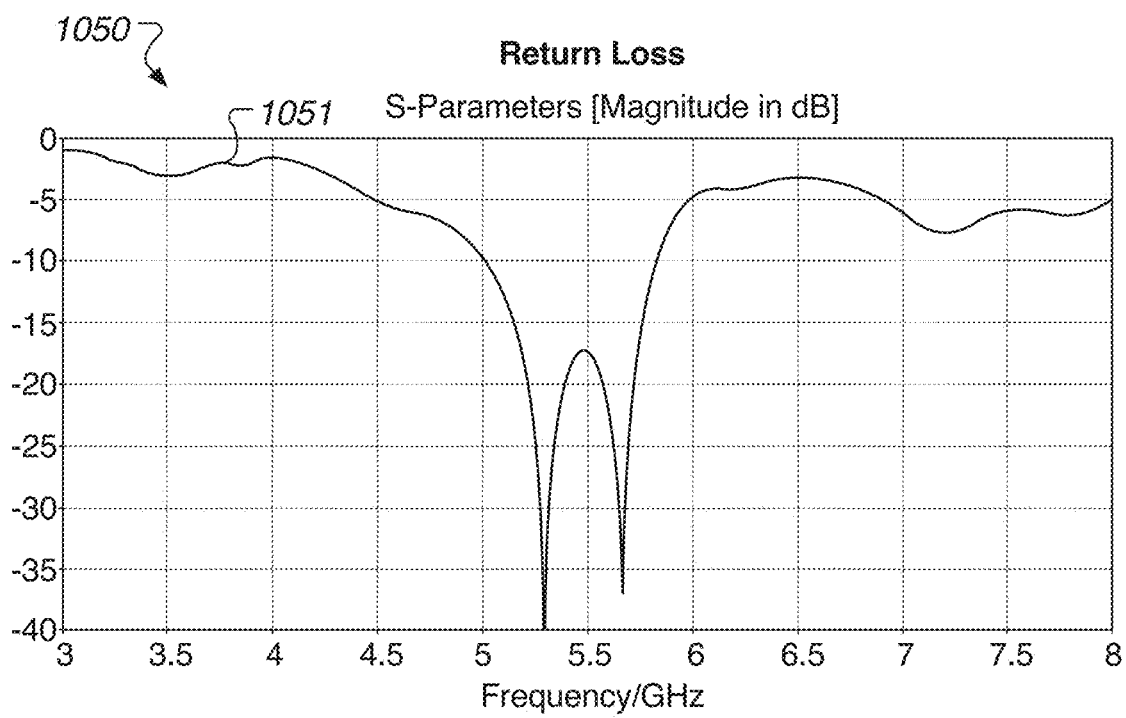
FIG. 10C is a graph of a return loss of the omnidirectional antenna of FIG. 10A according to one embodiment.

FIG. 10C is a graph 1050 of a return loss of the omnidirectional antenna of FIG. 10A according to one embodiment. The graph 1050 illustrates that the omnidirectional antennas can be caused to radiate electromagnetic energy between approximately 4.6 GHz to approximately 6 GHz.

Figure 10D:
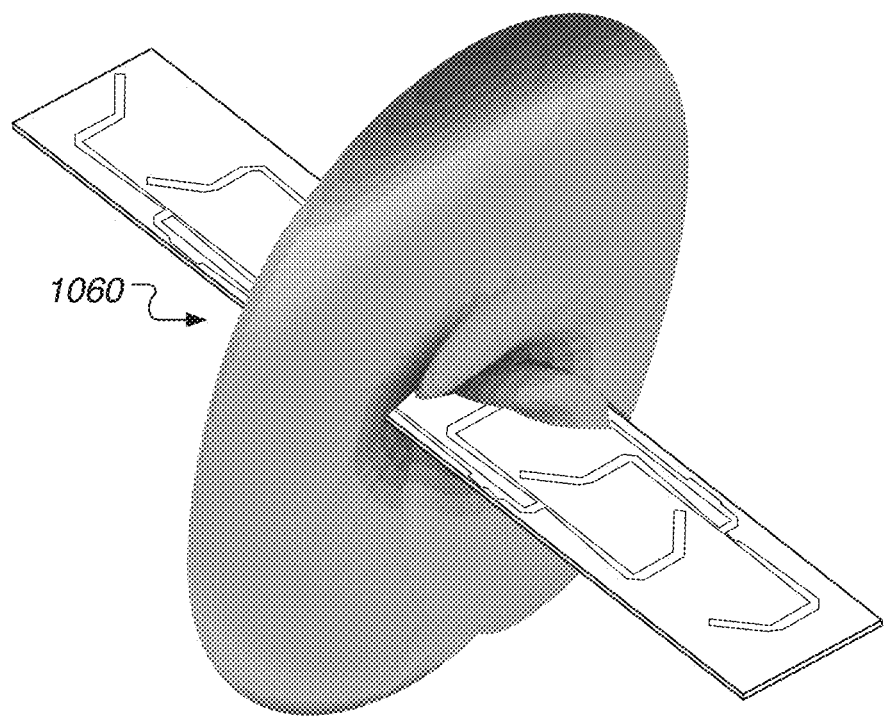
FIG. 10D illustrates an omnidirectional radiation pattern of the omnidirectional antenna of FIG. 10A according to one embodiment.

FIG. 10D illustrates an omnidirectional radiation pattern of the omnidirectional antenna of FIG. 11A according to one embodiment. As described herein, the first surface-link antenna, in response to RF signals from the second WLAN radio, radiates electromagnetic energy with a first cross-polarization radiation pattern in a first direction away from a first plane of the first PCB, and the second surface-link antenna, in response to RF signals from the fourth WLAN radio, radiates electromagnetic energy with a second cross-polarization radiation pattern in a second direction away from a second plane of the first PCB. The first and second cross-polarization radiation patterns result in the omnidirectional radiation pattern 1060 illustrated in FIG. 10D.

FIG. 11A is perspective view of an antenna carrier 1100 with a pair of a high gain directional antennas, each with a 8-element patch antenna array 902 on a top layer 1104 of a PCB 1106 and a feed network 908 on a bottom layer 1110 of the PCB 1106 according to one embodiment. FIG. 11B illustrates a top view and a bottom view of one of the high gain directional antennas of FIG. 11A. The antenna carrier 1100 is similar to the antenna carrier 900 of FIG. 9A as noted by similar reference numbers. The antenna carrier 1100 is dissimilar to the antenna carrier 900 as described herein. The antenna carrier 1100 includes a mount assembly 1112 having a first elongated housing in which a first surface-link antenna of the pair is disposed, a second elongated housing in which a second surface-link antenna of the pair is disposed. The antenna carrier 1100 also includes four RF connectors 914 that couple to a respective RF cable (not illustrated). The RF connectors 914 may be SMA connectors. Alternatively, other types of connectors may be used. The antenna carrier 1100 may also include a hinge 1116 that can adjust a relative angle between a first plane of a first PCB in the first housing and a second plane of a second PCB in the second housing.

In the depicted embodiment, the first surface-link antenna includes a first PCB with eight patch elements 902 connected electrically in parallel with a first set of metal lines. Each of the eight patch elements is located in a first plane of the first PCB. The second surface-link antenna includes a second PCB comprising eight patch elements connected in parallel with a second set of metal lines. In one embodiment, the dimensions of one of the PCB antennas are approximately 326 mm×34 mm×1.6 mm. Alternatively, other dimensions may be used. It should be noted that FIG. 11B illustrates the top layer 1104 and the bottom layer 1110 of one of the two PCBs, but the other PCB would have the same design.

FIG. 11C is a graph 1150 of a return loss of the high gain directional antenna of FIG. 11A according to one embodiment. The graph 1150 illustrates that the high gain directional antennas can be caused to radiate electromagnetic energy between approximately 4.6 GHz to approximately 6 GHz.

Figure 11D:
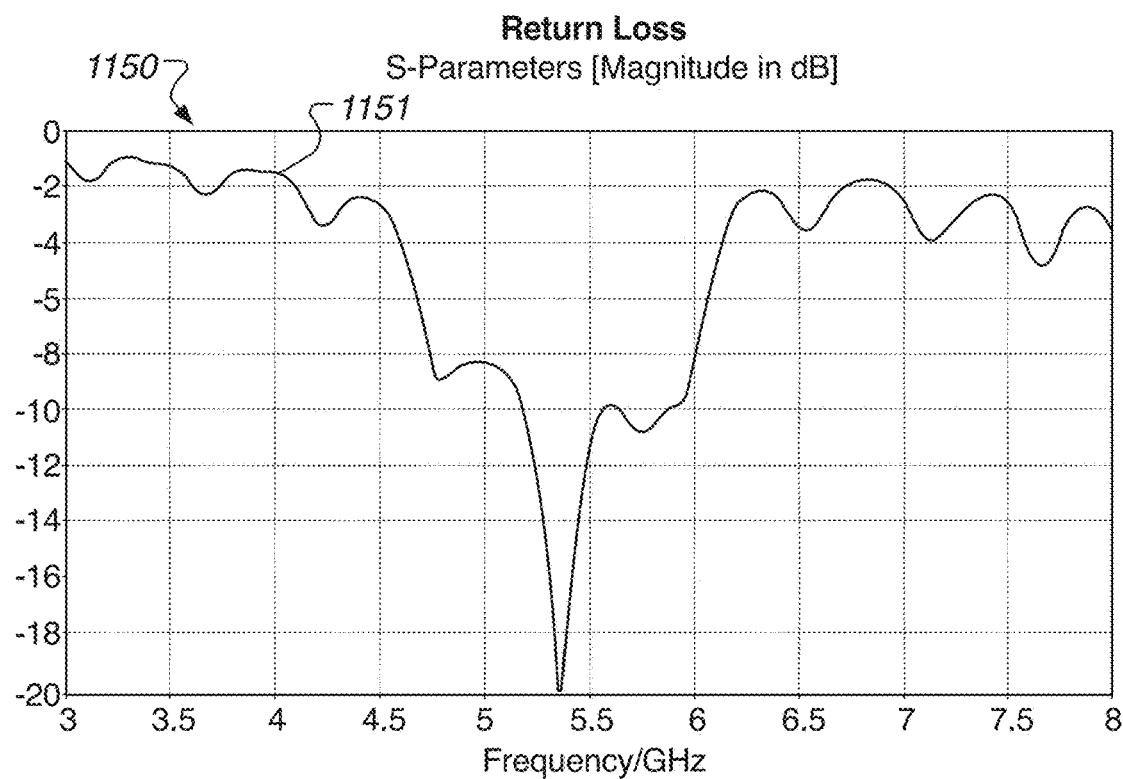
FIG. 11D illustrates a directional radiation pattern of the high gain directional antennas of FIG. 11A according to one embodiment.
Figure 11D:
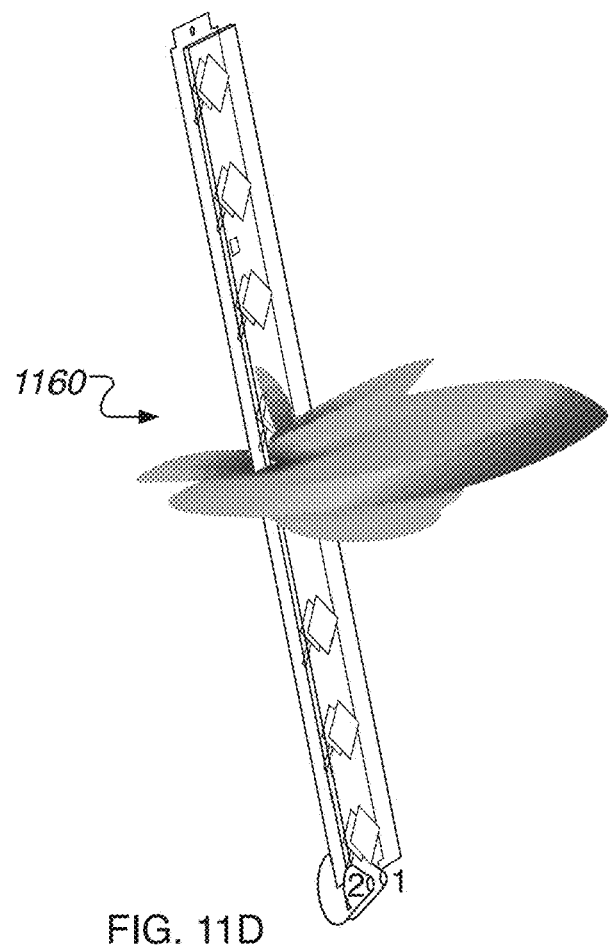

FIG. 11D illustrates a directional radiation pattern 1160 of the high gain directional antennas of FIG. 11A according to one embodiment. As described herein, the first surface-link antenna, in response to RF signals from the second WLAN radio, radiates electromagnetic energy with a first cross-polarization radiation pattern in a first direction away from a first plane of the first PCB, and the second surface-link antenna, in response to RF signals from the fourth WLAN radio, radiates electromagnetic energy with a second cross-polarization radiation pattern in a second direction away from a second plane of the first PCB. The first and second cross-polarization radiation patterns result in the high gain directional radiation pattern 1160 illustrated in FIG. 11D.

Figure 12B:
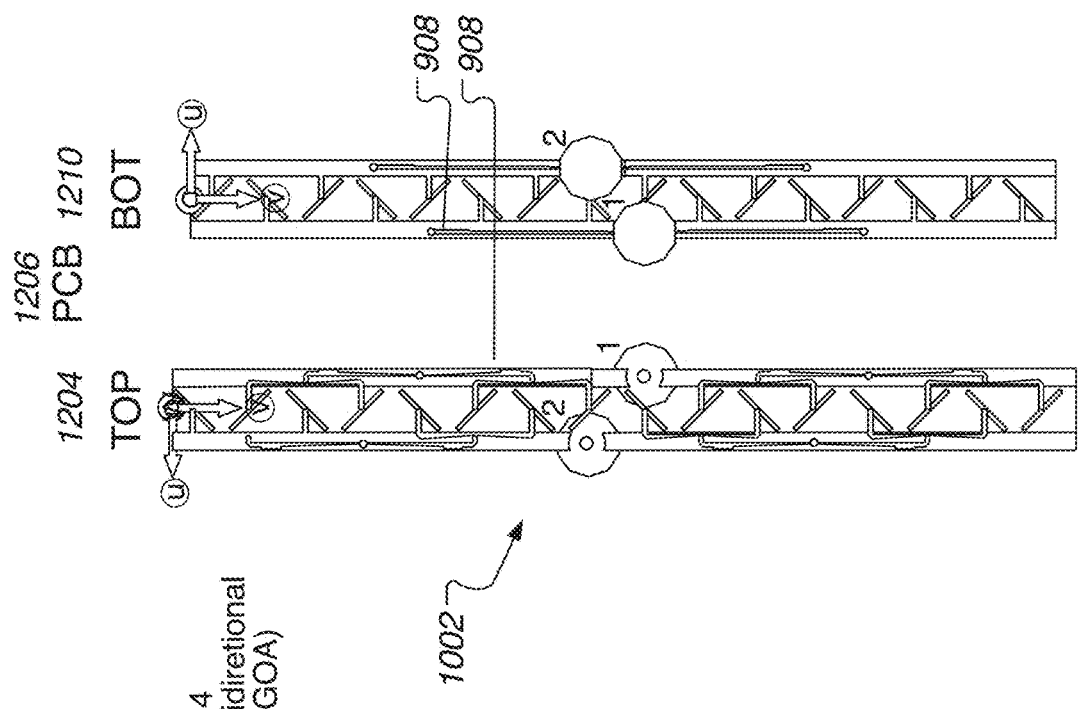
FIG. 12B illustrates a top view and a bottom view of the high gain omnidirectional antenna of FIG. 12A according to one embodiment.
Figure 12A:
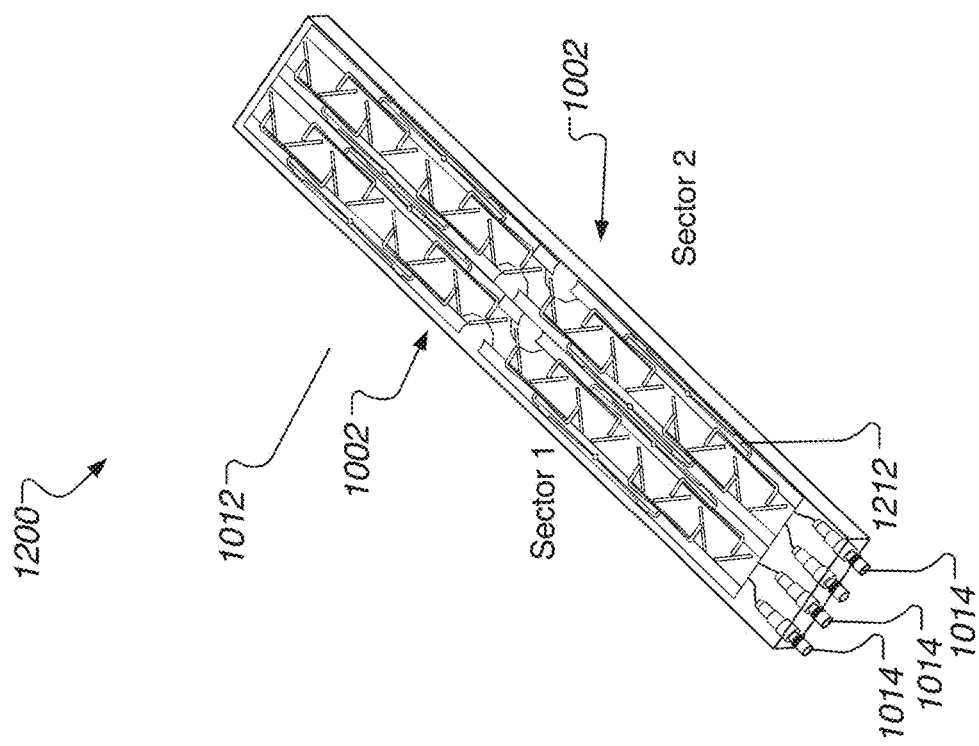
FIG. 12A is perspective view of a high gain omnidirectional antenna with a 8-element printed dipole antenna array on a top layer of a PCB and a feed network on a bottom layer of the PCB according to one embodiment.

FIG. 12A is perspective view of an antenna carrier 1200 with a pair of high gain omnidirectional antennas, each with a 8-element printed dipole antenna array 1202 on a top layer 1204 of a PCB 1206 and a feed network 1208 on a bottom layer 1210 of the PCB 1206 according to one embodiment. FIG. 12B illustrates a top view and a bottom view of the high gain omnidirectional antenna of FIG. 12A according to one embodiment. The antenna carrier 1200 is similar to the antenna carrier 1000 of FIG. 10A as noted by similar reference numbers. The antenna carrier 1200 is dissimilar to the antenna carrier 1000 as described herein. The antenna carrier 1200 includes a mount assembly 1212 having an elongated housing in which a pair of surface-link antennas is disposed. The antenna carrier 1200 also includes four RF connectors 1014 that couple to a respective RF cable (not illustrated). The RF connectors 1014 may be SMA connectors. Alternatively, other types of connectors may be used. In this embodiment, the antenna carrier 1200 does not include a hinge because the radiating elements of the surface-link antennas are mounted on the top layer 1204 (first plane) of the PCB 1206. In another embodiment, the some radiating element can be disposed on the top layer 1204 (first plane) and other radiating elements can be disposed on the bottom layer 1210 (second plane) of the PCB 1206. The first plane and the second plane are parallel to each other.

In the depicted embodiment, the mount assembly 1212 may include one or two PCBs or two portions of a single PCB. In the depicted embodiment of two PCBs, a first PCB includes a first surface-link antenna and a second PCB includes a second surface link antennas. The first surface-link antennas includes a first set of dipole elements (e.g., four in FIG. 12) disposed on the first PCB and connected electrically in parallel with a first set of metal lines and a second set of dipole elements (e.g., four in FIG. 12) disposed on the first PCB and connected electrically in parallel with a second set of metal lines. The second surface-link antenna includes a third set of dipole elements (e.g., four in FIG. 12) disposed on the second PCB and connected electrically in parallel with a third set of metal lines and a fourth set of dipole elements (e.g., four in FIG. 12) disposed on the second PCB and connected electrically in parallel with a fourth set of metal lines.

In one embodiment, the dimensions of one of the PCB antennas are approximately 320 mm×30 mm×1.6 mm. Alternatively, other dimensions may be used. It should be noted that FIG. 12B illustrates the top layer 1204 and the bottom layer 1210 of one of the two PCBs, but the other PCB would have the same design.

Figure 12C:
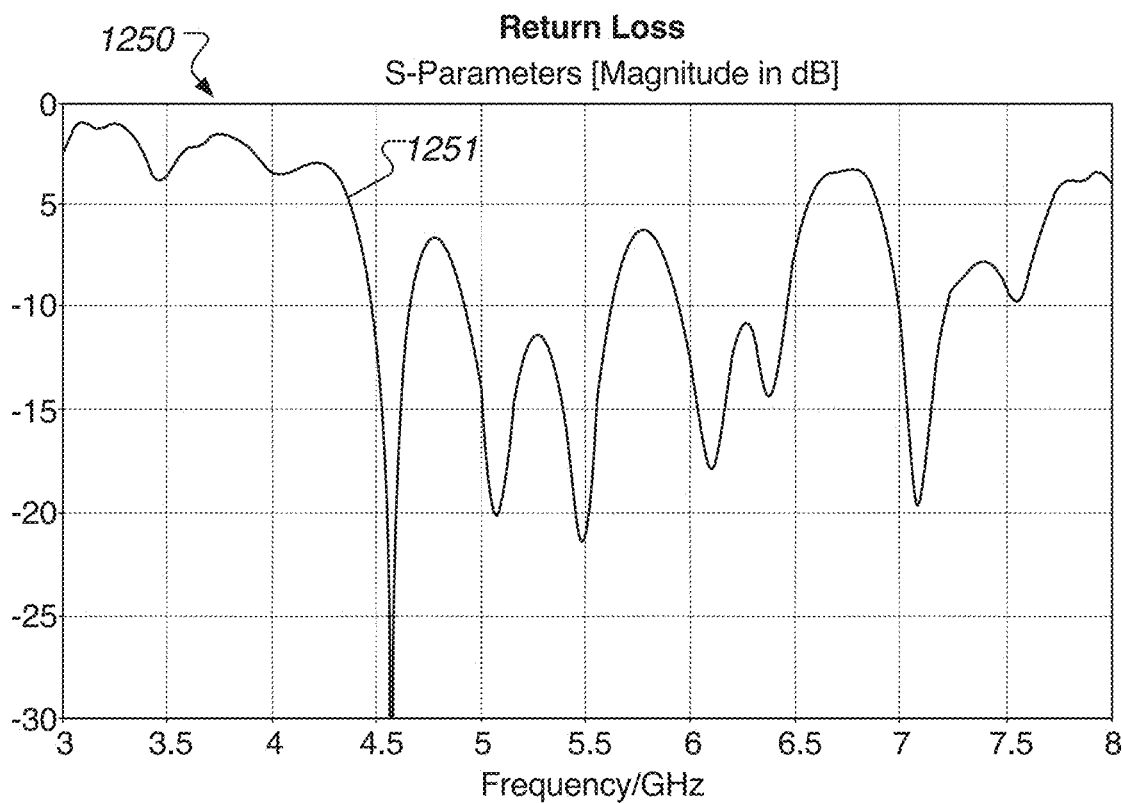
FIG. 12C is a graph of a return loss of high gain omnidirectional antenna of FIG. 12A according to one embodiment.

FIG. 12C is a graph 1250 of a return loss 1251 of high gain omnidirectional antenna of FIG. 12A according to one embodiment. The graph 1250 illustrates that the omnidirectional antennas can be caused to radiate electromagnetic energy between approximately 4.6 GHz to approximately 6 GHz.

Figure 12D:
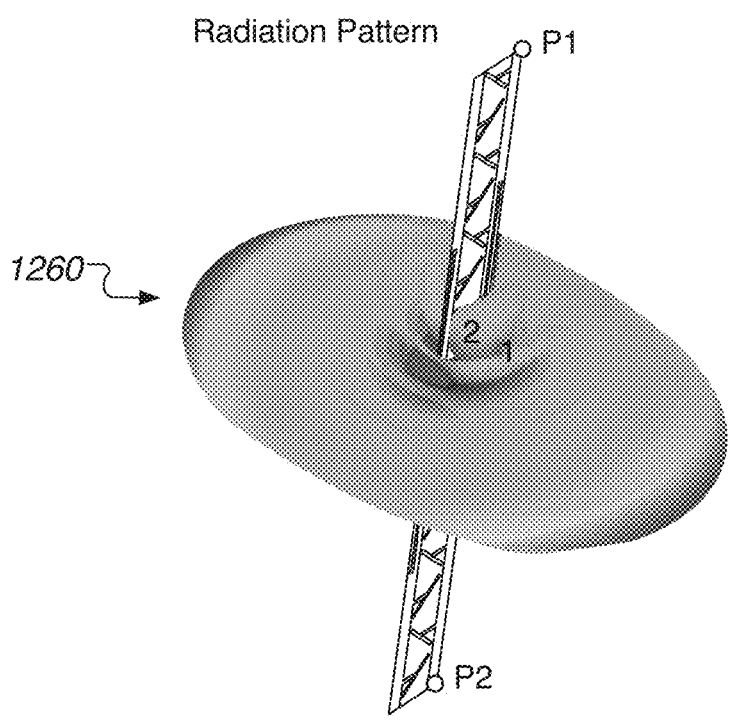
FIG. 12D illustrates an omnidirectional radiation pattern of the high gain omnidirectional antenna of FIG. 12A according to one embodiment.

FIG. 12D illustrates an omnidirectional radiation pattern 1260 of the high gain omnidirectional antennas of FIG. 12A according to one embodiment. As described herein, the first surface-link antenna, in response to RF signals from the second WLAN radio, radiates electromagnetic energy with a first cross-polarization radiation pattern in a first direction away from a first plane of the first PCB, and the second surface-link antenna, in response to RF signals from the fourth WLAN radio, radiates electromagnetic energy with a second cross-polarization radiation pattern in a second direction away from a second plane of the first PCB. The first and second cross-polarization radiation patterns result in the omnidirectional radiation pattern 1260 illustrated in FIG. 12D.

In one embodiment, the first set and the second set form a first N-element patch antenna array disposed on the first PCB and the third set and the fourth form a second N-element patch antenna array disposed on the second PCB, where N is a positive integer that is a multiple of two. In another embodiment, the first set and the second set form a first N-element printed dipole element array disposed on the first PCB and the third set and the fourth form a second N-element printed dipole antenna array disposed on the second PCB, where N is a positive integer that is a multiple of two.

It should be noted that the RF connectors of FIG. 12A are located at an end of the antenna carrier 1200. In another embodiment, the RF connectors can be located centrally on the antenna carrier 1200. For example, as illustrated in FIG. 12B, the feed locations are centrally located between the sets of printed dipole antenna elements of the 8-element printed dipole antenna arrays.

Figure 12E:
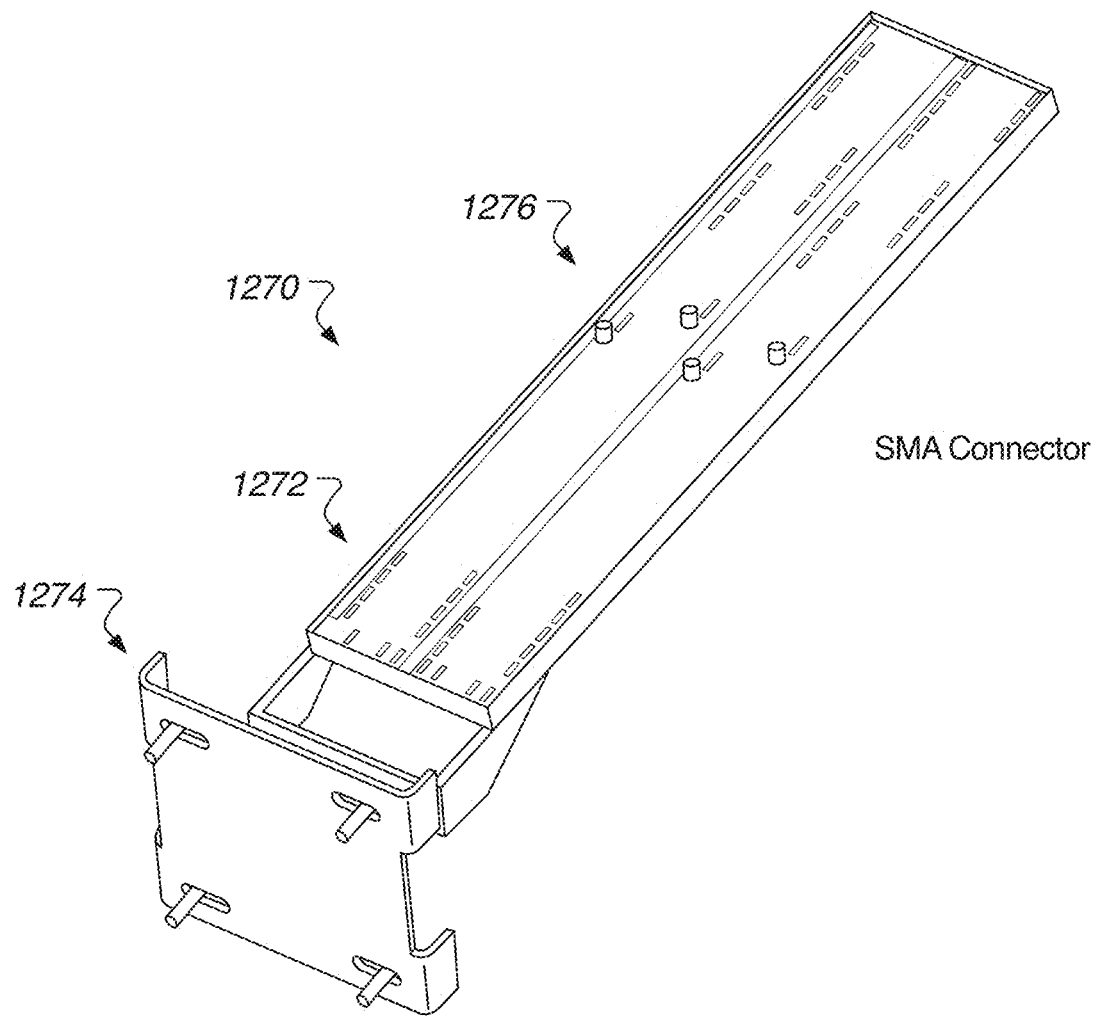
FIG. 12E is a perspective view of one embodiment of an antenna carrier with an elongated mount assembly in which surface-link antennas are disposed and a mounting bracket to secure the elongated mount assembly to an external surface of a building according to one embodiment.

FIG. 12E is a perspective view of one embodiment of an antenna carrier 1270 with an elongated mount assembly 1272 in which surface-link antennas are disposed and a mounting bracket 1274 to secure the elongated mount assembly 1272 to an external surface of a building according to one embodiment. As illustrated in FIG. 12E, RF connectors 1276 are centrally located on the elongated mount assembly 1272 between the different sets of antenna elements of the surface-line antennas. For example, the first RF connector and the second RF connector are located between the first set of antenna elements and the second set of antenna elements on the first PCB and the third RF connector and the fourth RF connector are located between the third set of antenna elements and the fourth set of antenna elements on the second PCB. Alternatively, the four RF connectors are located at an end of the mountable assembly. The RF connectors 1276 may be SMA connectors or other types of RF connectors.

Figure 13:
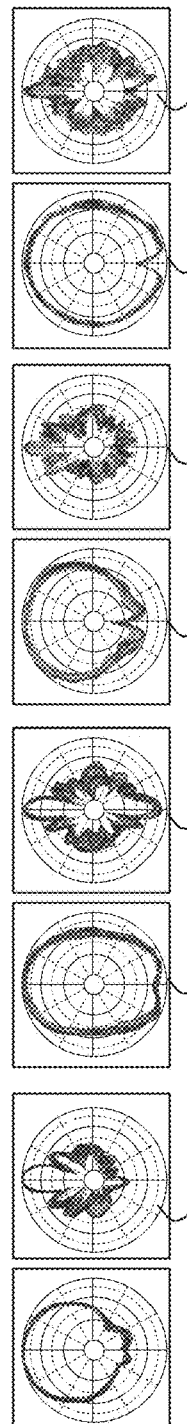
FIG. 13 is a table and corresponding radiation patterns of four antenna designs according to various embodiments.

FIG. 13 is a table 1300 of parameters and corresponding radiation patterns of four antenna designs according to various embodiments. The table 1300 includes parameters for a directional antenna 1302, an omnidirectional antenna 1304, a high gain directional antenna 1306, and a high gain omnidirectional antenna 1308. The directional and omnidirectional antennas may correspond to the antennas described above. The parameters include the gain an azimuth angle, an elevation angle, and sector isolation. The directional antenna 1302 has a 10 dB gain, 70° azimuth, 17° elevation, and 35 dB sector isolation. The omnidirectional antenna 1304 has a 6.5 dB gain, 90° azimuth, 17° elevation, and 30 dB sector isolation. The high gain directional antenna 1306 has a 13 dB gain, 70° azimuth, 8.5° elevation, and 35 dB sector isolation. The high gain omnidirectional antenna 1308 has a 9.5 dB gain, 90° azimuth, 8.5° elevation, and 30 dB sector isolation. The radiation pattern of the directional antenna 1302 can be represented by the azimuth radiation pattern 1310 and the elevation radiation pattern 1312. The radiation pattern of the omnidirectional antenna 1304 can be represented by the azimuth radiation pattern 1314 and the elevation radiation pattern 1316. The radiation pattern of the high gain directional antenna 1306 can be represented by the azimuth radiation pattern 1318 and the elevation radiation pattern 1320. The radiation pattern of the high gain omnidirectional antenna 1308 can be represented by the azimuth radiation pattern 1322 and the elevation radiation pattern 1324.

Figure 14:
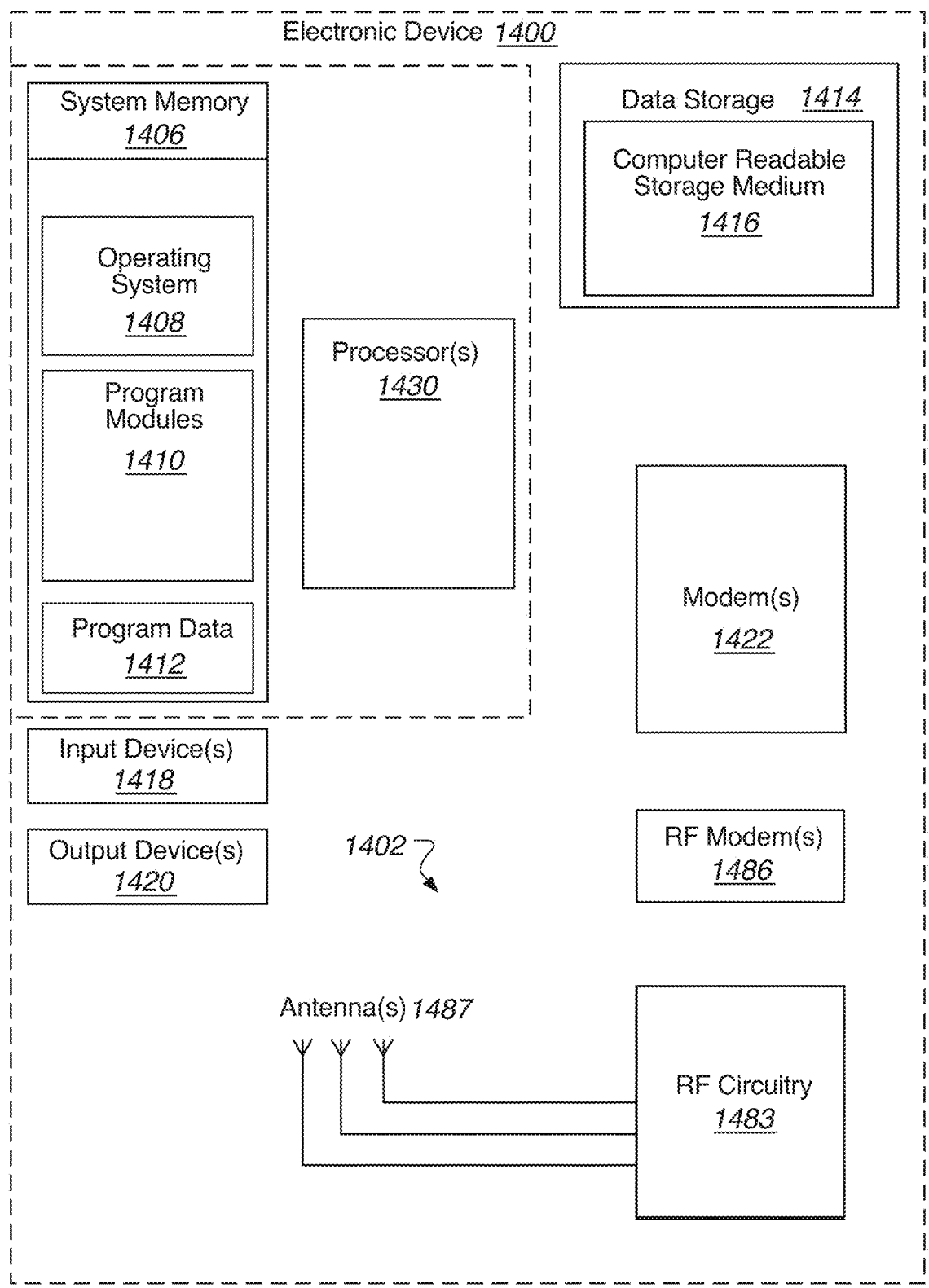
FIG. 14 is a block diagram of a wireless network device according to one embodiment.

FIG. 14 is a block diagram of a wireless network device 1400 according to one embodiment. The wireless network device 1400 may correspond to the wireless network device described above. Alternatively, the wireless network device 1400 may be other electronic devices as described herein.

The wireless network device 1400 includes one or more processor(s) 1430, such as one or more CPUs, microcontrollers, field programmable gate arrays, or other types of processors. The wireless network device 1400 also includes system memory 1406, which may correspond to any combination of volatile and/or non-volatile storage mechanisms. The system memory 1406 stores information that provides operating system component 1408, various program modules 1410, program data 1412, and/or other components. In one embodiment, the system memory 1406 stores instructions of methods to control operation of the wireless network device 1400. The wireless network device 1400 performs functions by using the processor(s) 1430 to execute instructions provided by the system memory 1406.

The wireless network device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 may reside, completely or at least partially, within the computer-readable storage medium 1416, system memory 1406 and/or within the processor(s) 1430 during execution thereof by the wireless network device 1400, the system memory 1406 and the processor(s) 1430 also constituting computer-readable media. The wireless network device 1400 may also include one or more input devices 1418 (keyboard, mouse device, specialized selection keys, etc.) and one or more output devices 1420 (displays, printers, audio output mechanisms, etc.).

The wireless network device 1400 further includes a modem 1422 to allow the wireless network device 1400 to communicate via a wireless connections (e.g., such as provided by the wireless communication system) with other computing devices, such as remote computers, an item providing system, and so forth. The modem 1422 can be connected to one or more RF modules 1486. The RF modules 1486 may be a WLAN module, a WAN module, a PAN module, GPS module, or the like. The antenna structures (antenna(s) 1487) are coupled to the RF circuitry 1483, which is coupled to the modem 1422. The RF circuitry 1483 may include radio front-end circuitry, antenna switching circuitry, impedance matching circuitry, or the like. The antennas 1484 may be WLAN antennas (such as the surface-link antennas described herein, GPS antennas, NFC antennas, other WAN antennas, WLAN or PAN antennas, or the like. The modem 1422 allows the wireless network device 1400 to handle both voice and non-voice communications (such as communications for text messages, multimedia messages, media downloads, web browsing, etc.) with a wireless communication system. The modem 1422 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1422 may generate signals and send these signals to antenna(s) 1484 of a first type (e.g., WLAN 5 GHz), antenna(s) 1485 of a second type (e.g., WLAN 2.4 GHz), and/or antenna(s) 1487 of a third type (e.g., WAN), via RF circuitry 1483, and RF module(s) 1486 as descried herein. Antennas 1487 may be configured to transmit in different frequency bands and/or using different wireless communication protocols. The antennas 1487 may be directional, omnidirectional, or non-directional antennas. In addition to sending data, antennas 1487 may also receive data, which is sent to appropriate RF modules connected to the antennas. One of the antennas 1487 may be any combination of the antenna structures described herein.

In one embodiment, the wireless network device 1400 establishes a first connection using a first wireless communication protocol, and a second connection using a different wireless communication protocol. The first wireless connection and second wireless connection may be active concurrently, for example, if a wireless network device is receiving a media item from another wireless network device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1422 is shown to control transmission and reception via antenna (1487), the wireless network device 1400 may alternatively include multiple modems, each of which is configured to transmit/receive data via a different antenna and/or wireless transmission protocol.

In the above description, the embodiments of the surface-link antennas and antenna architectures may be used in a wireless network containing multiple network devices, organized in a network topology (e.g., AP-STA, Mesh, and Hybrid). The network devices in the wireless network cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These wireless networks can be used in the interim before broadband Internet infrastructure becomes widely available in those developing nations. The wireless network devices are also referred to herein as mesh routers, mesh network devices, mesh nodes, Meshboxes, or Meshbox nodes, even when not used in mesh configurations. Multiple wireless network devices wirelessly are connected through a network backbone formed by multiple peer-to-peer (P2P) wireless connections (i.e., wireless connections between multiple pairs of the wireless network devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like.

The embodiments of the wireless network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to,"

as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless network device comprising:
   a housing comprising a circuit board and a first antenna port and located inside a building;
   a processor disposed on the circuit board;
   a first antenna disposed within the housing;
   a first wireless local area network (WLAN) radio disposed on the circuit board and coupled to the first antenna, wherein the first WLAN radio communicates with a radio of a client device using the first antenna over a first wireless link;
   a second WLAN radio disposed on the circuit board and coupled to the first antenna port; and
   a second antenna located along an exterior surface of the building and coupled to the first antenna port via a cable, wherein the second WLAN radio communicates with a radio of a second wireless network device using the second antenna over a second line-of-sight (LOS) wireless link.

2. The wireless network device of claim 1, further comprising:
   a third antenna located along an exterior surface of the building; and
   a third WLAN radio disposed on the circuit board and coupled to a second antenna port of the housing, wherein the third WLAN radio communicates with a radio of a third wireless network device using the third antenna over a third LOS wireless link, wherein the second antenna is coupled to the second antenna port and radiates electromagnetic energy with a first directional radiation pattern and the third antenna radiates electromagnetic energy with a second directional radiation pattern.

3. The wireless network device of claim 1, further comprising:
   a third antenna located along an exterior surface of the building; and
   a third WLAN radio disposed on the circuit board and coupled to a second antenna port of the housing, wherein the third WLAN radio communicates with the radio of the second wireless network device using the second and third antennas over the second LOS wireless link, wherein the third antenna is coupled to the second antenna port, and wherein the second antenna and the third antenna radiate electromagnetic energy with an omnidirectional radiation pattern.

4. The wireless network device of claim 1, wherein the second WLAN radio is a first 2×2 multiple-input-multiple-output (MIMO) radio comprising a first MIMO port and a second MIMO port, the first MIMO port being coupled to a first element of the second antenna via the first antenna port and the second MIMO port being coupled to a second element of the second antenna, wherein the first 2×2 MIMO radio communicates with the radio of the second wireless network device over the second LOS wireless link.

5. The wireless network device of claim 4, further comprising:
   a third antenna disposed within the housing;
   a fourth antenna disposed within the housing;
   a first switch coupled between the first MIMO port, the first element, and the third antenna; and
   a second switch coupled between the second MIMO port, the second element, and the fourth antenna.

6. The wireless network device of claim 4, further comprising:
   a second 2×2 MIMO radio disposed on the circuit board, the second 2×2 MIMO radio comprising a third MIMO port and a fourth MIMO port, the third MIMO port being coupled to a third element of a third antenna and the fourth MIMO port being coupled to a fourth element of the third antenna, wherein the second 2×2 MIMO radio communicates with a radio of a third wireless network device using the third antenna over a third LOS wireless link or with the radio of the second wireless network device using the second and third antennas over the second LOS wireless link.

7. The wireless network device of claim 6, further comprising:
   a fourth antenna disposed within the housing;
   a fifth antenna disposed within the housing;
   a sixth antenna disposed within the housing;
   a seventh antenna disposed within the housing;
   a first switch coupled between the first MIMO port, the first element, and the fourth antenna;
   a second switch coupled between the second MIMO port, the second element, and the fifth antenna;
   a third switch coupled between the third MIMO port, the third element, and the sixth antenna; and
   a fourth switch coupled between the fourth MIMO port, the fourth element, and the seventh antenna.

8. The wireless network device of claim 6, further comprising:
   a first filter circuit coupled between the first MIMO port and the first antenna port;
   a second filter circuit coupled between the second MIMO port and the second antenna, the first filter circuit and the second filter circuit to filter RF signals for the second antenna within a first frequency range;
   a third filter circuit coupled between the third MIMO port and the third antenna; and
   a fourth filter circuit coupled between the fourth MIMO port and the fourth antenna, the third filter circuit and the fourth filter circuit to filter RF signals for the third antenna within a second frequency range.

9. The wireless network device of claim 8, wherein the first frequency range is approximately 5.15 GHz to approximately 5.35 GHz and the second frequency range is approximately 5.725 GHz to approximately 5.925 GHz.

10. The wireless network device of claim 1, further comprising:
    a first printed circuit board (PCB), wherein the second antenna comprises:
      a first set of patch elements or dipole elements disposed on the first PCB and connected electrically in parallel; and
      a second set of patch elements or dipole elements disposed on the first PCB and connected electrically in parallel; and
    a second PCB comprising a third antenna comprising:
      a third set of patch elements or dipole elements disposed on the second PCB and connected electrically in parallel; and a fourth set of patch elements or dipole elements disposed on the second PCB and connected electrically in parallel.

11. The wireless network device of claim 10, further comprising a hinge to adjust a relative angle between the first PCB and the second PCB.

12. The wireless network device of claim 10, wherein the first set and the second set form a first N-element patch antenna array disposed on the first PCB and the third set and the fourth set form a second N-element patch antenna array disposed on the second PCB, wherein N is a positive integer that is a multiple of two.

13. A wireless network device comprising:
a processor;
a first antenna;
a 2.4 GHz local area network (WLAN) radio coupled to the first antenna, wherein the 2.4 GHz WLAN radio is configured to communicate with a radio of a client device using the first antenna over a first wireless link;
a 5 GHz WLAN radio; and
a first surface-link antenna coupled to the 5 GHz WLAN radio via a radio frequency (RF) cable and mounted on an exterior surface of a building, wherein the 5 GHz WLAN radio is configured to communicate with a radio of a second wireless device using the first surface-link antenna over a second wireless link, wherein the second wireless link is a line-of-sight (LOS) wireless link.

14. The wireless network device of claim 13, wherein the processor is configured to:
establish the first wireless link between the 2.4 GHz WLAN radio and the radio of the client device located within the building, wherein the first wireless link is a LOS link or a non-line-of-sight (NLOS) link through or around at least one wall or floor of the building; and
establish the second wireless link between the 5 GHz WLAN radio and the radio of the second wireless device using a radiation pattern of electromagnetic energy focused along the exterior surface of the building.

15. The wireless network device of claim 13, further comprising:
a third WLAN radio coupled to the processor; and
a second surface-link antenna coupled to the third WLAN radio via a second RF cable and mounted on the exterior surface of the building, wherein the third WLAN radio is configured to communicate with a radio of a third wireless device using the second surface-link antenna over a third wireless link, wherein the third wireless link is a second LOS wireless link.

16. The wireless network device of claim 15, further comprising a mount assembly comprising:
a first elongated housing in which the first surface-link antenna is disposed;
a second elongated housing in which the second surface-link antenna is disposed;
a hinge to adjust a relative angle between a first printed circuit board (PCB) upon which the first surface-link antenna is disposed and a second PCB upon which the second surface-link antenna is disposed;
a first RF connector coupled to the first surface-link antenna and the RF cable; and
a second RF connector coupled to the second surface-link antenna and the second RF cable.

17. The wireless network device of claim 16, wherein:
the first surface-link antenna comprises four patch elements disposed on the first PCB and connected electrically in parallel;
the second surface-link antenna comprises four patch elements disposed on the second PCB and connected in parallel;
the first surface-link antenna, in response to RF signals from the 5 GHz WLAN radio, radiates electromagnetic energy with a first slant-polarization radiation pattern in a first direction away from a first plane of the first PCB; and
the second surface-link antenna, in response to RF signals from the third WLAN radio, radiates electromagnetic energy with a second slant-polarization radiation pattern in a second direction away from a second plane of the first PCB.

18. A wireless network device comprising:
a housing comprising a circuit board and a first antenna port and located inside a building;
a processor disposed on the circuit board;
a first antenna disposed within the housing;
a first wireless local area network (WLAN) radio disposed on the circuit board and coupled to the first antenna, wherein the first WLAN radio communicates with a radio of a client device using the first antenna over a first wireless link;
a second WLAN radio disposed on the circuit board and coupled to the first antenna port; and
a second antenna located along an exterior surface of the building and coupled to the first antenna port via a cable, wherein the second antenna comprises:
a printed circuit board (PCB); and
a set of antenna elements disposed on the PCB and connected electrically in parallel, wherein the second WLAN radio is configured to communicate with a radio of a second wireless device using the second antenna over a second line-of-sight (LOS) wireless link, wherein the set of antenna elements is configured to radiate electromagnetic energy focused along the exterior surface of the building.

19. The wireless network device of claim 18, wherein each of the set of antenna elements is at least one of a patch element or a dipole element.

20. The wireless network device of claim 18, further comprising:
a third WLAN radio disposed on the circuit board and coupled to a second antenna port; and
a third antenna coupled to the second antenna port and located along the exterior surface of the building, wherein the third antenna comprises:
a second PCB; and
a second set of antenna elements disposed on the second PCB and connected electrically in parallel, wherein the third WLAN radio is configured to communicate with a radio of a third wireless device using the third antenna over a third LOS wireless link, wherein:
the second set of antenna elements is configured to radiate electromagnetic energy focused along the exterior surface of the building;
the set of antenna elements is configured to radiate electromagnetic energy in a first directional radiation pattern; and the second set of antenna elements is configured to radiate electromagnetic energy in a second directional radiation pattern that is in a different direction than the first directional radiation pattern.

* * * * *